United States Patent
Kalekar et al.

(10) Patent No.: US 9,104,339 B1
(45) Date of Patent: Aug. 11, 2015

(54) SUPPORT TRACK ALIGNED PARTITIONS INSIDE VIRTUAL MACHINES

(75) Inventors: Santosh Pravin Kalekar, Pune (IN); Vipul Jain, Pune (IN)

(73) Assignee: Symantec Corporation, Mountain View, CA (US)

( * ) Notice: Subject to any disclaimer, the term of this patent is extended or adjusted under 35 U.S.C. 154(b) by 181 days.

(21) Appl. No.: 13/457,808

(22) Filed: Apr. 27, 2012

(51) Int. Cl.
*G06F 3/06* (2006.01)

(52) U.S. Cl.
CPC .............. *G06F 3/0665* (2013.01); *G06F 3/061* (2013.01); *G06F 3/0676* (2013.01); *G06F 3/0664* (2013.01)

(58) Field of Classification Search
CPC ... G06F 3/0631; G06F 3/0664; G06F 3/0665; G06F 3/0629; G06F 3/061; G06F 3/0676
USPC .................................. 711/5, 6, 114, 154, 203
See application file for complete search history.

(56) References Cited

U.S. PATENT DOCUMENTS

| | | | | |
|---|---|---|---|---|
| 5,671,439 | A * | 9/1997 | Klein et al. | 710/1 |
| 8,171,201 | B1 * | 5/2012 | Edwards, Sr. | 711/6 |
| 8,332,571 | B1 * | 12/2012 | Edwards, Sr. | 711/6 |
| 2005/0034125 | A1 * | 2/2005 | Guy et al. | 718/100 |
| 2011/0125977 | A1 * | 5/2011 | Karr et al. | 711/162 |
| 2011/0197039 | A1 * | 8/2011 | Green et al. | 711/162 |

* cited by examiner

*Primary Examiner* — Arpan P. Savla
*Assistant Examiner* — Shane Woolwine
(74) *Attorney, Agent, or Firm* — Campbell Stephenson LLP

(57) ABSTRACT

In response to a request received from a guest alignment module, host alignment module determines a target starting location in a virtual hard disk to which the beginning of a guest partition of a virtual machine is written. Host alignment module translates a guest partition's virtual hard disk address into a physical hard disk address and determines whether the physical hard disk address is track aligned with disk tracks of the physical hard disk. If the physical hard disk address is not track aligned, host alignment module determines a new track aligned physical hard disk address as the target starting location. If the physical hard disk address is track aligned, the same physical hard disk address is used as the target starting location. The target starting location is returned to the guest alignment module as a new virtual hard disk address.

21 Claims, 12 Drawing Sheets

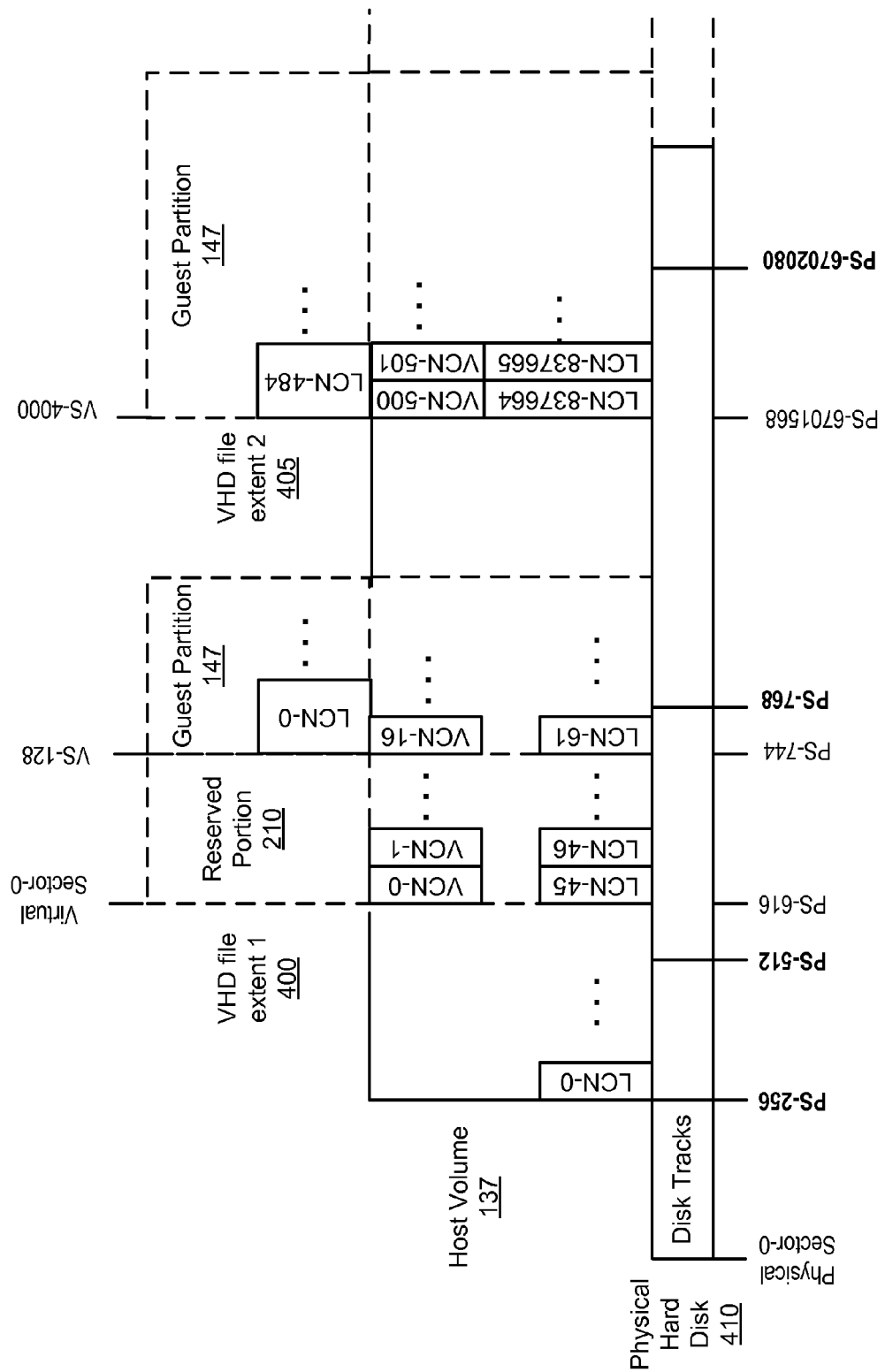

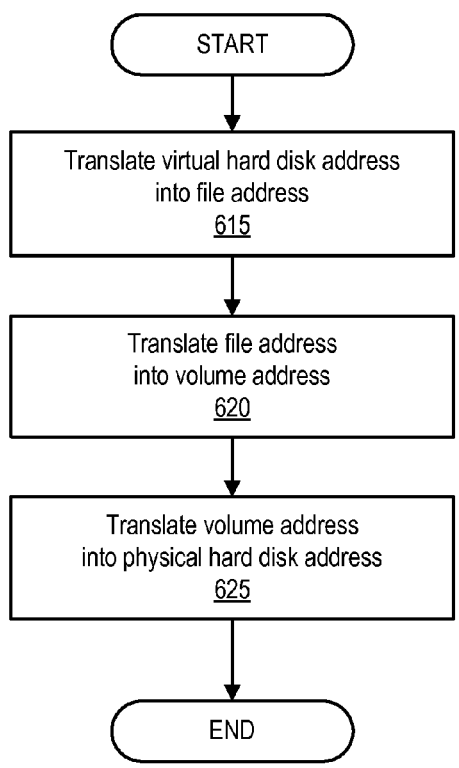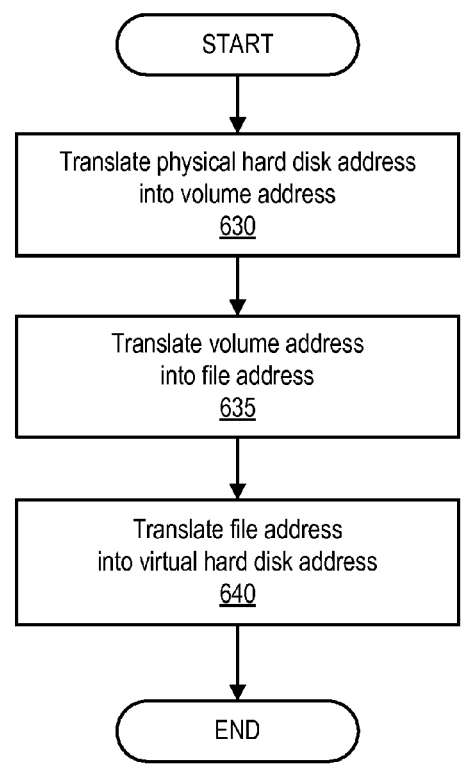
Fig. 6A
Fig. 6B

SUPPORT TRACK ALIGNED PARTITIONS INSIDE VIRTUAL MACHINES

FIELD OF THE INVENTION

This invention relates generally to track alignment and, more particularly, alignment of partitions of a virtual machine to underlying physical disk tracks.

DESCRIPTION OF THE RELATED ART

Disk partition alignment can benefit a host machine by improving I/O performance. For example, a misaligned partition can result in clusters of data being read or written across physical hard disk track boundaries. A misaligned cluster that overlaps a boundary of two disk tracks can cause an I/O operation (e.g., read or write operation) directed to the misaligned cluster to be directed to the two disk tracks (rather than a single disk track) that each contain portions of the misaligned cluster. Thus, aligning a partition of a host machine can improve hard disk performance, for example, by reducing time spent performing I/O operations (e.g., I/O operation time for two disk tracks reduced to I/O operation time for one disk track). However, clusters contained within a partition of a guest machine often do not undergo a similar disk partition alignment with underlying hard disk track boundaries. Thus, misaligned clusters of a guest machine can overlap track boundaries and diminish I/O performance.

SUMMARY OF THE INVENTION

The present disclosure provides for creating track aligned partitions in virtual machines, where the partitions are aligned with hard disk tracks of a physical machine on which the virtual machines are implemented. In response to a partition alignment request received from a guest alignment module, a host alignment module can be configured to determine a target starting location at which the beginning of a guest partition can be written in a virtual hard disk of a virtual machine. Alignment module can translate a virtual hard disk address (e.g., a starting location of a guest partition) into a physical hard disk address. Host alignment module can determine whether the physical hard disk address is track aligned with the disk tracks, where a track aligned physical hard disk address corresponds to a first sector of a disk track. If the physical hard disk address is not track aligned, host alignment module can determine a new physical hard disk address aligned with the disk tracks as the target starting location. If the physical hard disk address is track aligned, the same physical hard disk address can be used as the target starting location. Host alignment module can return the target starting location to guest alignment module. Guest alignment module can return the target starting location to the guest machine as a virtual hard disk address, where the guest machine can write the beginning of the guest partition at the target starting location.

BRIEF DESCRIPTION OF THE DRAWINGS

The present invention may be better understood, and its numerous objects, features and advantages made apparent to those skilled in the art by referencing the accompanying drawings.

FIG. 4E is a block diagram illustrating an example virtual hard disk file stored in host volume as one or more file extents, according to one embodiment.

FIGS. 6A and 6B are flow charts illustrating acts of example translation sub-processes implemented by an alignment module, according to one embodiment.

Figure 1:
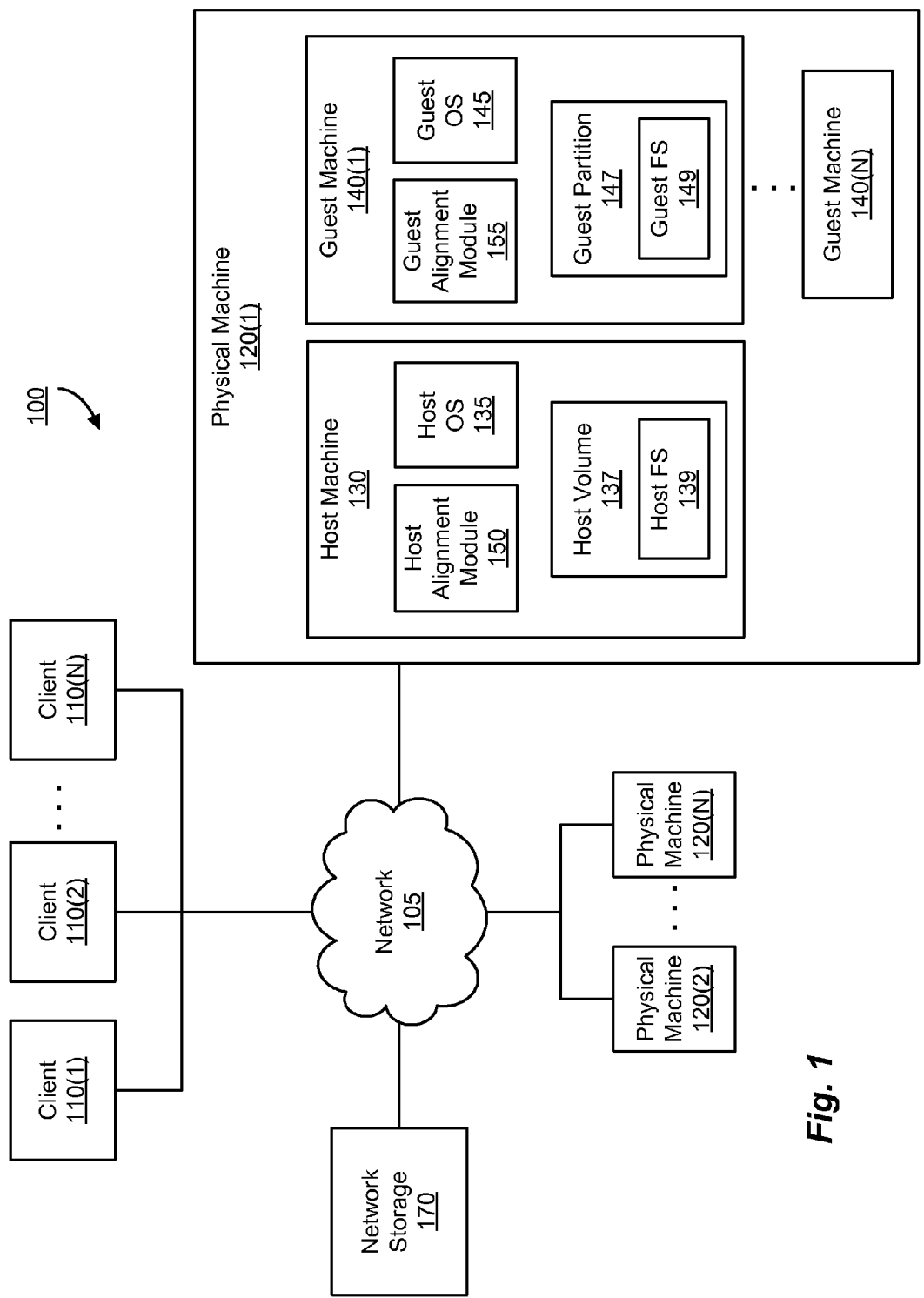
FIG. 1 is a block diagram illustrating components of an example virtualization system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

FIG. 1 is a block diagram illustrating components of an example virtualization system 100, in which the present disclosure can be implemented. Virtualization system 100 includes a network 105 that communicatively couples one or more client devices 110(1)-(N), one or more physical machines 120(1)-(N), and network storage 170. Each component is discussed in further detail below.

One or more client devices 110(1)-(N), also referred to herein as client systems and/or clients, can be implemented using, for example, a desktop computer, a laptop computer, a workstation, a server, or the like. An example of such computing devices is described subsequently, in connection with FIG. 8. One or more clients 110(1)-(N) can be configured to access one or more guest machines 140(1)-(N) on physical machines 120(1)-(N) via network 105. An example of network 105, which can be used by clients 110(1)-(N) to access the guest machines 140(1)-(N) on physical machines 120(1)-(N), can be a local area network (LAN) utilizing Ethernet, IEEE 802.11x, or some other communications protocol. As will be appreciated, network storage 170 can also be accessed by clients coupled directly thereto (not shown).

One or more physical machines 120(1)-(N), also referred to generally herein as a physical machine 120, can be physical servers on which virtual machines, such as a host machine 130 and/or guest machines 140(1)-(N), are instantiated. Each physical machine 120 has a plurality of system resources available for use by the host machine 130 and guest machines 120(1)-(N), such as a processor, memory, network adapters, and peripheral devices. Each physical machine 120 has a physical hard disk drive, which is divided into areas called disk tracks, and each disk track is divided into sections called sectors. A sector is the smallest physical unit of disk space on which a disk read or disk write operation can be performed. An example sector size used herein is 512 bytes. Common sector values include 256 bytes, 512 bytes, 1024 bytes (1 MB), 2048 bytes (2 MB), and 4096 bytes (4 MB). An example disk track size used herein is 256 sectors, but can range from 1 to a maximum sectors per track (SPT) value defined by the disk vendor, where different disk vendors use different track sizes (e.g., a disk track can have a maximum of 65535 (0xffff) sectors when SPT is a 64 KB value). Each physical machine 120 can include a virtual machine manager (not shown), also known as a hypervisor, to manage the execution of the guest machines 140(1)-(N) on the physical machine 120. A hypervisor can create logical partitions on the physical machine within which a host machine 130 (e.g., within a parent partition) and guest machines 140(1)-(N) (e.g., each within a child partition) can execute.

A host machine 130 can run on each physical machine 120(1)-(N). A host machine 130 can have direct access to system resources (e.g., processor, memory, network adapters, and peripheral devices) of the physical machine 120, as if the host machine 130 were the physical machine 120. An operating system (OS) 135 can be installed on the host machine, also referred to herein as a host operating system 135 or host OS 135. The host operating system 135 can manage the system resources accessible by the host machine 130 (e.g., allocates access to system resources among various resource requests) and provide common services for application software running in the host machine. A host machine 130 can manage guest machine access to the system resources. Guest machines 140(1)-(N) can transmit guest requests to a virtual representation of the system resources, and host machine 130 can receive the guest requests and complete the guest requests on behalf of the guest machines (e.g., sending the guest requests to the system resources for completion, returning information to the requesting guest machine in response to the system resources completing the guest request).

A host machine 130 running on the physical machine 120 can also have a file system (FS) 139. A file system on a host machine 130 is also referred to herein as a host file system 139 or host FS 139, which is responsible for organizing and managing files stored on the physical hard drive accessible by the host machine. A host file system provides a structure in which files of the host machine are stored. This structure can be built within an allocation of disk space, such as an entire disk device, a partition within a disk device, or a volume. In the embodiments shown herein, an example host file system 139 is built within a host volume 137 that resides on the physical hard disk of physical machine 120, where the host volume 137 contains files and data (e.g., host OS files, applications, and application data) of the host machine 130. For purposes of this disclosure, folders are considered to be a special type of file, and thus references made herein to files can include special files such as folders.

One or more guest machines 140(1)-(N), also referred to generally herein as a guest machine 140, can also run on one or more physical machines 120(1)-(N). A guest machine 140 can be a software implementation of a physical machine (e.g., computer). Like a physical machine, the contents and structure of a guest machine can be contained in a hard disk drive associated with the guest machine 140, where the guest machine's hard disk drive is a virtual representation of a physical hard disk drive, also referred to herein as a virtual hard disk drive or virtual hard disk.

A virtual hard disk drive can be stored within a software container, also referred to herein as a virtual hard disk image. A virtual hard disk image can be a single file that contains the complete contents and structure of the virtual hard disk drive of the guest machine 140. A virtual hard disk image can be stored in a virtual hard disk (VHD) file format, also referred to herein as a VHD file. VHD files can be stored on one or more physical machines 120 and/or on network storage 170 (e.g., backend storage, attached network storage). A VHD file can be connected or attached to a guest machine 140. Multiple guest machines 140 can be instantiated on a physical machine 120, with each guest machine 140 running off of an associated virtual hard disk and sharing the system resources of the physical machine 120. However, guest machines 140 are tightly isolated on a physical machine 120, meaning that the software running inside a guest machine 140 can be limited to the virtual representation of system resources defined within the guest machine 140.

A guest machine 140 can also have an operating system 145, also referred to herein as a guest operating system (OS) 145, and a file system 149, referred to herein as a guest file system (FS) 149. Once a guest partition 147 is created on a virtual hard disk of the guest machine 140, the guest partition 147 can be formatted with a file system 149. A guest file system 149 is responsible for organizing and managing files stored on the virtual hard drive of the guest machine 140. A guest file system 149 provides a structure in which files of the guest machine are stored. This structure can be built within an allocation of disk space, such as an entire disk device, a partition within a disk device, or a volume. In the embodiments shown herein, an example guest file system 149 is built within a guest partition 147 that resides on the virtual hard disk of guest machine 140, where the guest partition 147 contains files and data (e.g., guest OS files, applications, and application data) of guest machine 140. A guest machine 140 can run off of a virtual hard disk drive and can execute its own operating system (OS) and applications as if the guest machine 140 were a physical machine (e.g., computer).

A host machine 130 can be configured to create and configure new guest machines 140(1)-(N) and virtual hard disks for guest machines 140(1)-(N) using a disk management utility provided by a host OS 135. Disk management utility can be configured to provide functions for managing virtual and physical hard disks of the system (e.g., hard disks that are visible to the host machine 130, such as virtual hard disks located on the physical machine 120 or on attached storage). A guest OS 145 can also provide a disk management utility, also referred to herein as a guest disk management utility, that a guest machine 140 can use to create a guest partition 147 on the virtual hard disk, as discussed in further detail below. Examples of disk management utilities include Disk Management in Windows® (available from Microsoft® Corporation of Redmond, Wash.), DiskPart Command-Line Utility (available from Microsoft® Corporation of Redmond, Wash.), VMware® Virtual Disk Manager (available from VMware®, Inc. of Palo Alto, Calif.), and other disk management utilities from third party vendors.

A new guest machine 140 can be created via a hypervisor utility (e.g., Hyper-V® Manager for Windows®, available from Microsoft® Corporation of Redmond, Wash.). For example, the hypervisor utility can communicate with the hypervisor to create a new child partition on the physical machine 120 for the new guest machine 140. Host machine 130 can create a guest machine 140 within the new child partition. Host machine 130 can allocate system resources to the new guest machine 140 by defining a virtual representation of the system resources that the new guest machine can access. The new guest machine 140 can be stored in host FS 139 as a configuration file, which can include the configurable virtual representations of system resources. Host machine 130 can also create a virtual hard disk for the new guest machine, using disk management utility. A virtual hard disk can be stored as a virtual hard disk (VHD) file in host FS 139. Host machine 130 can expose or attach the virtual hard disk to the new guest machine 140. The new guest machine 140 can initialize the virtual hard disk and can create a partition (also referred to herein as a guest partition) in the virtual hard disk. The starting default location of the guest partition depends on the guest operating system implemented in the new guest machine 140, where different guest operating systems use different starting default locations for a guest partition. The default partition size can also depend on the guest operating system implemented. A file system can be formatted on top of the guest partition. The default cluster size within the guest partition depends on the guest file system implemented, where different guest file systems use different default cluster sizes. However, an administrator can override the default cluster size.

A file system (e.g., a host file system 139 and/or a guest file system 149) manages files using an allocation unit, such as a cluster, as the smallest logical unit of disk space that can store file data. A file spans at least one cluster (even if the size of the file is less than the size of the cluster) and can span multiple clusters. A cluster can include multiple sectors, but cluster size is not necessarily dependent on sector size. An example cluster size used herein is 4 KB, which can include 8 sectors of 512 bytes. Another example cluster size used herein is 8 KB, which can include 16 sectors of 512 bytes. A cluster of a host file system is also referred to herein as a host cluster, and a cluster of a guest file system is also referred to herein as a guest cluster. Example file systems include New Technology File System (NTFS, available from Microsoft® Corporation of Redmond, Wash.), Veritas™ File System (VxFS, available from Symantec™ Corporation of Mountain View, Calif.), and VMware® Virtual Machine File System (VMFS, available from VMware®, Inc. of Palo Alto, Calif.), as well as other file systems provided by third party vendors.

A file system can reside on a volume, which is managed by a volume manager. For example, the host file system 139 can reside on host volume 137 that is managed by a volume manager (not shown), also referred to herein as a host volume manager. A volume manager can be configured to manage the volumes on the host machine 130 and can use the host file system services to retrieve data from the host file system 139. A volume manager can be compatible with the implemented operating system. For example, a volume manager on host machine 130 can be compatible with the host OS 135. Examples of a volume manager include VMFS Volume Management (available from VMware®, Inc. of Palo Alto, Calif.), Veritas™ Volume Manager (available from Symantec™ Corporation of Mountain View, Calif.), and other volume managers provided by third party vendors.

Host clusters can be track aligned using a track alignment mechanism, such as the track alignment functionality provided by Veritas™ Storage Foundation for Windows (available from Symantec™ Corporation of Mountain View, Calif.). A track alignment mechanism can be configured to automatically (without user intervention) align a starting or first cluster of a host volume with a physical machine's underlying hard disk tracks, where aligned clusters of the host volume do not overlap track boundaries of the hard disk tracks. A cluster that is not aligned with hard disk tracks may overlap a boundary of two disk tracks, and an I/O operation (e.g., read or write operation) directed to the single cluster can result in the I/O operation being directed to two disk tracks (rather than a single disk track) that contain the cluster. Thus, aligning clusters of a host volume with hard disk tracks can improve hard disk performance, for example, by reducing time spent performing I/O operations (e.g., I/O operation time for two disk tracks reduced to I/O operation time for one disk track). However, such track alignment mechanisms fail to align clusters of a guest file system (which can be located within guest partition 147 that resides on a virtual hard disk) with the physical machine's underlying hard disk tracks, where the guest clusters may overlap track boundaries.

Figure 3:
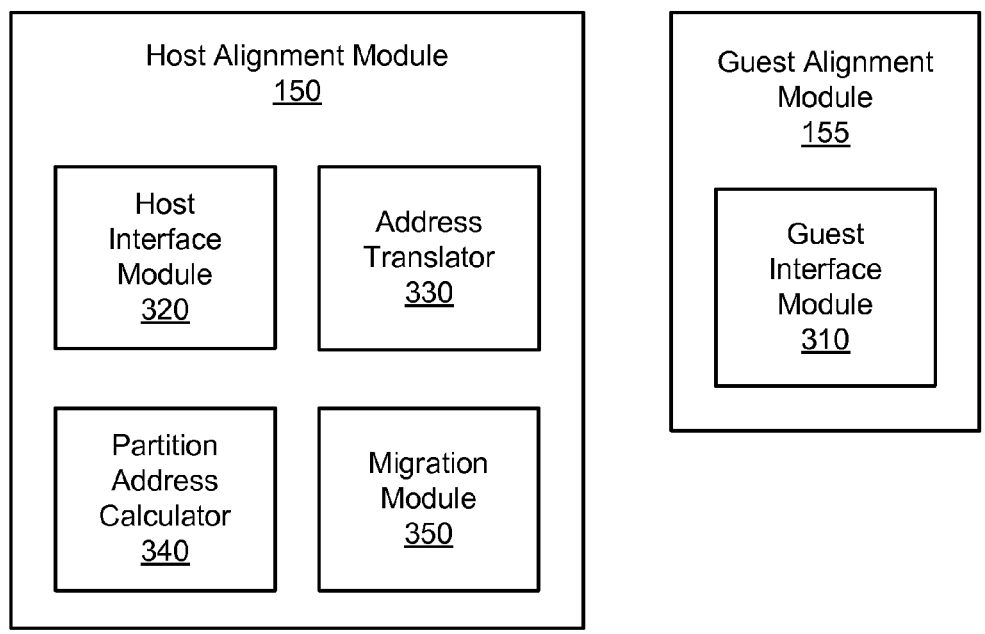
FIG. 3 is a block diagram illustrating components of an example alignment module, according to one embodiment.

A host alignment module 150 and a guest alignment module 155, which are discussed in further detail in reference to FIG. 3, can be implemented to prevent guest clusters from overlapping track boundaries. One way to avoid guest clusters from overlapping track boundaries is to align the beginning of a guest partition containing the guest clusters with a first sector of a disk track. Host alignment module 150 can be configured to determine a target starting location on the physical hard disk tracks to which a guest partition can be written and guest alignment module 155 can provide the target starting location to the guest machine 140 when creating a guest partition. The target starting location identifies a first sector of a physical hard disk track, also referred to herein as a disk track or hard disk track. Thus, creating a guest partition that starts at the target starting location and writing the guest clusters contained within the guest partition contiguously to the physical hard disk starting at the first sector of the identified hard disk track (e.g., target starting location) can result in alignment of the guest clusters with the underlying hard disk tracks, where the aligned guest clusters will not overlap a track boundary.

A host alignment module 150 can be implemented in a host machine 130, and a guest alignment module 155 can be implemented in a guest machine 140. Host alignment module 150 can be configured to communicate with guest alignment module 155 via hypervisor calls, (e.g., calls to a hypervisor, such as Hyper-calls in a Hyper-V® environment, available from Microsoft® Corporation of Redmond, Wash.) and/or network application programming interfaces (APIs) that facilitate communication between host components and guest components. Host alignment module 150 can be configured to communicate with a volume manager configured to use host file system services to retrieve data from host FS 139, via a command line interface and/or APIs. Host alignment module 150 can also be configured to communicate with the host file system 139 to retrieve data from host FS 139. Guest alignment module 155 can be configured to communicate with a disk management utility provided by a guest OS 145, also referred to herein as guest disk management utility, via a dedicated disk management console, a command line interface, and/or APIs. In one embodiment, functionality of a host alignment module 150 can be implemented as a software application component that can execute in host machine 130. In one embodiment, functionality of a guest alignment module 155 can be implemented as a software application component that can execute in guest machine 140. In another embodiment, functionality of a guest alignment module 155 can be implemented as a plug-in that can be added to the guest disk management utility of the guest OS 145.

Network storage 170 can provide backend storage for VHD files of guest machines 140(1)-(N). Network storage 170 can be implemented as network attached storage (NAS), file servers, storage filers, and/or network shares. Network storage can be implemented as a single storage device or as a collection of storage devices. Network storage can also be implemented as a storage area network (SAN), which couples remote storage devices to a server (e.g., a storage server), such that the remote storage devices appear as locally-attached storage devices to the server's OS, for example. Network storage can include a data volume, such as a cluster shared volume.

In light of the present disclosure, it will be appreciated that network storage 170 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, virtualization system 100 and network 105 can include other components such as routers, firewalls and the like that are not germane to the discussion of the present disclosure and will not be discussed further herein. It will also be appreciated that other configurations are possible. For example, clients 110(1)-(N) can be directly coupled to physical machines 120(1)-(N) and/or network storage 170, and so on.

The letter N is used to indicate a variable number of devices or components. For example, a variable number of clients, physical machines, and guest machines are implemented in the virtualization system. Although the letter N is used in describing a variable number of instances of each of these different devices and components, a repeated use of the letter N does not necessarily indicate that each device and component has a same number of N instances implemented in the virtualization system.

Figure 2:
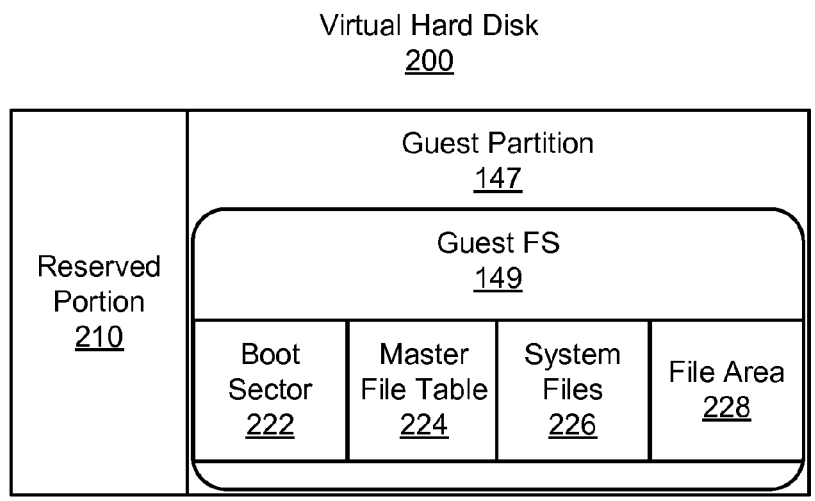
FIG. 2 is a block diagram that illustrates an example virtual hard drive, according to one embodiment.

FIG. 2 is a block diagram that illustrates an example virtual hard disk 200 of a guest machine 140. In one embodiment, a virtual hard disk 200 can include a reserved portion 210 and a guest partition 147. In the embodiment shown, the guest partition 147 of the virtual hard disk 200 has been formatted with a guest file system 149, where the guest file system 149 can contain the files and data (e.g., OS files, applications, and application data) of a guest machine 140. In the embodiment shown, the partition of the virtual hard disk contains an example guest file system 149 that can include a boot sector 222 (e.g., a partition boot sector located at the first sector of the guest partition 147), a master file table 224, system files 226, and a file area 228 for storing file data (e.g., extents of files). The guest file system contained in the partition can be one of a variety of file systems (e.g., NTFS, FAT (File Allocation Table) file system). Boot sector 222 can also include information about the virtual hard disk, such as the number of bytes per sector, clusters per sector, and sectors per track (e.g., disk track size).

Reserved portion 210 can be located before guest partition 147 in the virtual hard disk 200. Reserved portion 210 can be reserved for use by the operating system of the guest machine, and can include a boot record (e.g., a master boot record), which in turn can include a partition table that contains information describing locations, sizes, and other attributes of partitions contained in the virtual hard disk. A default size of the reserved portion can be defined by the host operating system that is used to create the virtual hard drive, and the value of the default size can be dependent on the specific operating system implemented in the host machine. For example, Windows® 2003 operating system (available from Microsoft® Corporation of Redmond, Wash.) defines the default size of the reserved portion to be 63 sectors. Thus, by default, a guest partition can begin at the next sector after the reserved 63 sectors, or at the $64^{th}$ sector of the virtual hard disk.

Logical block addressing is used herein, where each block, or sequential group of bytes, is addressed by an ordinal number that indicates the position of the block from the beginning of the container in which the block is contained. Using this addressing convention, the first sector of a hard disk can be addressed as sector offset 0, and the $64^{th}$ sector can be addressed as sector offset 63. A starting address of a guest partition 147 can be indicated in a boot record located in reserved portion 210, which can indicate the address of the starting sector of the guest partition 147, in reference to the virtual hard disk 200. A sector address of a guest partition 147 in relation to the virtual hard disk of the guest machine containing the guest partition is also referred to herein as a virtual sector address of the guest partition. A sector address of a guest partition in relation to the physical hard disk is also referred to herein as a physical sector address of the guest partition.

As another example, Windows® 2008 operating system (provided by Microsoft® Corporation of Redmond, Wash.) defines the default size of the reserved portion to be sixty-four kilobytes (64 KB) or one megabyte (1 MB) from the beginning of the hard disk, depending on the partition size. Thus, using a sector size of 512 bytes, a partition can start at a default sector offset of 128 (64 KB) or 2048 (1 MB) from the beginning of the virtual hard disk, depending on the partition size.

FIG. 3 is a block diagram illustrating components of an example host alignment module 150 and an example guest alignment module 155. A host alignment module 150 can include a host interface module 320, an address translator 330, a partition address calculator 340, and a migration module 350. A guest alignment module 155 can include a guest interface module 310. The components of the host alignment module 150 and guest alignment module 155 can cooperatively implement a process like that illustrated in FIG. 5. Each component is discussed in further detail below.

Guest alignment module 155 can include a guest interface module 310, which can be configured to communicate with a guest disk management utility provided by guest OS 145. For example, guest interface module 310 can be configured to receive a request from the guest disk management utility for an aligned partition address. In response to the guest request, guest interface module 310 can generate a partition alignment request. In another embodiment, guest interface module 310 can be configured to intercept a call (e.g., a call to the hypervisor) from guest disk management utility to create a guest partition 147. In response to the intercepted call, guest interface module 310 can generate a partition alignment request.

A partition alignment request can include a current starting location in the form of a virtual hard disk address relative to the virtual hard disk 200 (e.g., a virtual sector address), which can be used as a point of reference from which the host alignment module 150 can determine a target starting location of a guest partition 147. The received current starting location can be a default starting location used by the guest disk management utility to create a guest partition 147, or can be an existing starting location of an existing guest partition 147 in the virtual hard disk 200. A current starting location can correspond to a virtual hard disk address, a file address, a volume address, and a physical hard disk address. Guest interface module 310 can receive the current starting location from the guest disk management utility in the guest request, or the guest interface module 310 can obtain the current starting location from the guest disk management utility (e.g., guest interface module 310 can request a current starting location from the guest disk management utility in response to the intercepted call). Guest interface module 310 can also receive a default starting location, even if a guest partition already exists at an existing starting location in the virtual hard disk.

A partition alignment request can also include a sector size of the virtual hard disk 200, also referred to herein as guest sector size. Guest interface module 310 can receive guest sector size from guest disk management utility in the guest request, where the guest sector size is a default fixed sector size used during creation of the virtual hard disk 200. Alternatively, guest interface module 310 can obtain the guest sector size from guest disk management utility (e.g., guest interface module 310 can request the sector size from the guest disk management utility in response to the intercepted call).

Guest alignment module 155 can communicate the partition alignment request to host alignment module 150. In response to the partition alignment request, host alignment module 150 can determine a target starting location on the physical hard disk to which a guest partition 147 of a virtual hard disk 200 can be written. A target starting location can correspond to a virtual hard disk address, a file address, a volume address, and a physical hard disk address. Host alignment module 150 can return the target starting location in the form of a virtual hard disk address to guest alignment module 155, and guest interface module 310 can return the virtual hard disk address corresponding to the target starting location to guest disk management utility, which can create a guest partition starting at the target starting location.

Host alignment module 150 can include a host interface module 320, which can be configured to communicate with a host FS 139 and with a host volume manager that is configured to use host file system services to retrieve data stored in host FS 139. In response to receiving the partition alignment request from guest alignment module 155, host interface module 320 can request information about the host volume 137 and the physical hard disk from the host file system 139 and/or the host volume manager. Host interface module 320 can request the sector size of the physical hard disk, also referred to herein as host sector size (e.g., bytes per sector), and host disk track size (e.g., sectors per track) from the host volume manager. Host interface module 320 can request the host cluster size (e.g., bytes per cluster) from the host FS 139. The host volume manager can return the host sector size and host disk track size to the host interface module 320, and the host FS 139 can return the host cluster size to the host interface module 320.

A host alignment module 150 can include an address translator 330. Address translator 330 can receive the current starting location (or current virtual hard disk address) and guest sector size from guest interface module 310 in the partition alignment request. Address translator 330 can also receive the host cluster size from host interface module 320. Address translator 330 can be configured to translate the current virtual hard disk address of the partition alignment request into a current physical hard disk address. Address translator 330 can be configured to communicate with host file system 139 to use a virtual-to-logical mapping maintained in an allocation table of the host FS 139. Address translator 330 can also be configured to communicate with a volume manager of the host machine 130 to use a logical-to-physical mapping maintained by the host volume manager. The translation process is described in more detail in reference to FIGS. 6A and 6B.

In response to receiving the current virtual hard disk address, address translator 330 can translate the current virtual hard disk address (such as a virtual sector address relative to the virtual hard disk 200) into a current file address relative to the VHD file (such as a virtual cluster address), using the guest sector size. Address translator 330 can translate the current file address into a current volume address relative to the host volume 137 (such as a logical cluster address), using the host cluster size and a virtual-to-logical mapping maintained in an allocation table of the host FS 139. Address translator 330 can translate the current volume address into a current physical hard disk address (such as a physical sector address relative to the physical hard disk), using a logical-to-physical mapping maintained by the host volume manager. Thus, the current starting location corresponds to a current virtual hard disk address, a current file address, a current volume address, and a current physical hard disk address.

Host alignment module 150 can include a partition address calculator 340. Partition address calculator 340 can receive the current physical hard disk address from address translator 330, and can receive the host sector size and disk track size from host interface module 320. Partition address calculator 340 can be configured to determine whether the current physical hard disk address is track aligned. A track aligned physical hard disk address, such as a physical sector address relative to the physical hard disk, can correspond to a first sector of a disk track. Writing guest clusters (which are contained within the guest partition) contiguously to the physical hard disk starting at the first sector of the identified hard disk track can result in alignment of the guest clusters with the underlying hard disk tracks, where the aligned guest clusters will not overlap a track boundary.

If partition address calculator 340 determines that the current physical hard disk address is not track aligned (e.g., the current physical hard disk address does not correspond to a first sector address of a disk track), partition address calculator 340 can calculate a target starting location for the guest partition. Partition address calculator 340 can calculate the target starting location by calculating a new physical hard disk address (e.g., new physical sector address) that is aligned with the hard disk tracks.

If partition address calculator 340 determines that the current physical hard disk address is track aligned (e.g., the current physical hard disk address corresponds to a first sector address of a disk track), partition address calculator 340 can determine that the current physical hard disk address should be the target starting location for the guest partition, and can use the current physical hard disk address as the target starting location (e.g., can use the current physical sector address as the new physical sector address). Processes for determining whether a current physical hard disk address is track aligned and calculating a new physical hard disk address for a guest partition are described in more detail in reference to FIG. 5, and in sub-processes described in reference to FIGS. 7A and 7B.

Partition address calculator 340 can return the new physical hard disk address to address translator 330, which can translate the new physical hard disk address into a new virtual hard disk address. In response to receiving the new physical hard disk address, address translator 330 can translate the new physical hard disk address (such as a physical sector address relative to the physical hard disk) into a new volume address relative to the host volume 137 (such as a logical cluster address), using a logical-to-physical mapping maintained by the host volume manager. Address translator 330 can translate the new volume address into a new file address relative to the VHD file (such as a virtual cluster address), using the host cluster size and a virtual-to-logical mapping maintained in an allocation table of the host FS 139. Address translator 330 can translate the new file address into a new virtual hard disk address relative to the virtual hard disk 200 (such as a virtual sector address), using the guest sector size. Thus, the target starting location corresponds to a new virtual hard disk address, a new file address, a new volume address, and a new physical hard disk address. Partition address calculator 340 can provide the new virtual hard disk address to guest interface module 310. Guest interface module 310 can return the new virtual hard disk address that corresponds to the target starting location for the guest partition 147 to guest disk management utility.

A host alignment module 150 can determine a target starting location for a guest partition in various scenarios, such as when no previous partitions have been created in the virtual hard disk (e.g., after a virtual hard disk has been created and before any partitions have been created in the virtual hard disk), when a default guest partition has been previously created (e.g., after a default guest partition has been created in the virtual hard disk, where the default guest partition can be deleted from the virtual hard disk, and an aligned guest partition can be created in the virtual hard disk), and/or when an aligned guest partition has been previously created (e.g., after an aligned guest partition has been created in the virtual hard disk, and migration of the VHD file containing the guest partition has misaligned the guest partition).

A host alignment module 150 can also include a migration module 350, which is described in further detail in reference to FIG. 4E. If a VHD file containing an aligned guest partition were migrated to a new storage location in host volume 137 or in another storage device, guest clusters of the guest partition could be misaligned with underlying hard disk tracks in the new storage location. Migration module 350 can determine whether the guest partition of the VHD file is still aligned with underlying hard disk tracks. If the current physical hard disk address of the guest partition 147 is still track aligned, the guest clusters of the guest partition 147 are also still track aligned and the VHD file can remain in the new storage location. If the current physical hard disk address of the guest partition 147 is not track aligned, data clusters of the VHD file (e.g., virtual clusters of VHD file) can be moved or shifted in the host volume 137 to re-align the guest partition 147 with the next hard disk track. Migration module 350 can be configured to communicate with host FS 139 in order to move the VHD file.

In the embodiments shown in FIG. 4A-4E, guest clusters contained in a guest partition are illustrated at positions within the guest partition as if the guest partition were formatted with a guest file system using guest clusters of a multiple of the host cluster size. Thus, FIG. 4A-4E illustrate where the actual guest clusters of the guest partition should fall within the virtual and physical hard disks, once the guest partition has been created at either a default or target starting location, and has been formatted with a guest file system using a guest cluster size (which is a multiple of the host cluster size). As also shown in FIG. 4A-4E, depending on the cluster sizes of the guest clusters and the host clusters, aligning guest clusters with the physical hard disk may also result in the guest clusters being aligned with the host clusters of the host volume 137. However, such additional alignment, where guest cluster size can be equal to the host cluster size, or can be greater or smaller than the host cluster size. If guest cluster size is a whole integer multiple (e.g., 1, 2, 4) of host cluster size, aligning the guest clusters with the disk track may also result in the guest clusters being aligned with the host clusters that are also aligned with the disk track. These embodiments are illustrative and guest cluster size is not limited thereby. FIG. 4A-4E are not drawn to scale.

Figure 4A:
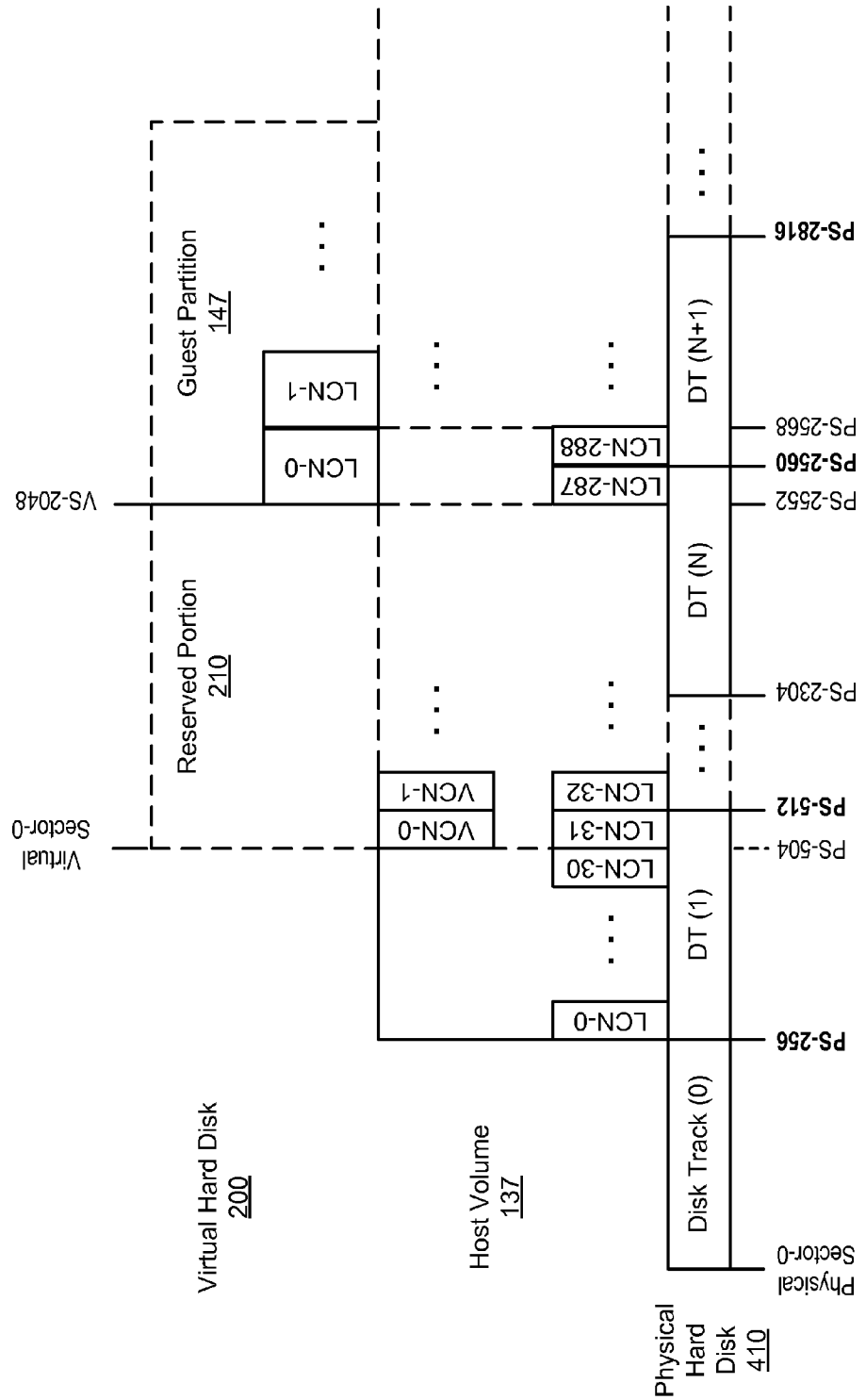
FIGS. 4A and 4B are block diagrams illustrating examples of guest partition misalignment with underlying physical disk tracks, according to one embodiment.

FIG. 4A is a block diagram that illustrates an example of guest partition misalignment with underlying physical disk tracks. Clusters of a host file system, or host clusters, can be located sequentially within a host volume 137. Logical block addressing is used herein, where each block, or sequential group of bytes, is addressed by an ordinal number that indicates the position of the block from the beginning of the container in which the block is contained. Using this addressing convention, a host volume 137 can be divided into host clusters that are each addressed with a logical address, such as a logical cluster number (LCN). The first host cluster of the host volume 137 can be addressed as LCN-0, and following sequential host clusters can be addressed with sequential LCN offsets (e.g., LCN-0, LCN-1, LCN-2, etc.). A track alignment mechanism can align host clusters of a host file system with hard disk tracks, as shown in FIG. 4A (e.g., the host clusters do not overlap track boundaries). A virtual hard disk (VHD) file that is stored in host FS 139 (and thus stored in the host volume 137) can be addressed by a starting logical address using an LCN offset of the host volume 137, which indicates the starting position of the VHD file relative to the beginning of the host volume 137. The starting logical address of the VHD file can be obtained from host FS 139. In the embodiment shown, the VHD file containing virtual hard disk 200 begins at LCN-31. A VHD file can be stored in a host volume 137 across multiple host clusters.

Logical block addressing can also be used to address clusters relative to a VHD file. A VHD file can be divided, using the host cluster size, into multiple contiguous data clusters, also referred to herein as virtual clusters. A starting point of the VHD file can be written to the beginning of a host cluster (rather than writing the starting point of the VHD file in the middle of a host cluster), meaning that the VHD file can be aligned with the host clusters. Each virtual cluster of the VHD file can be addressed with a virtual address relative to the beginning of the VHD file, such as a virtual cluster number (VCN). The first virtual cluster of the VHD file can be addressed as VCN-0, and the following sequential virtual clusters of the VHD file can be addressed with sequential VCN offsets (e.g., VCN-0, VCN-1, VCN-2, etc.). Each virtual cluster of the VHD file corresponds to a logical cluster of the host volume 137, and thus each virtual address relative to the VHD file corresponds to a logical address relative to the host volume. In the embodiment shown, VCN-0 corresponds to LCN-31. An allocation table, such as a master file table in NTFS, can provide a virtual-to-logical mapping of virtual addresses (e.g., VCN offsets) relative to a file stored in a host volume 137 (e.g., a VHD file) to corresponding logical addresses (e.g., LCN offsets) relative to the host volume 137. For example, each file record of an allocation table can correspond to a file stored in host volume 137, and each file record can provide a virtual-to-logical mapping of one or more VCN offsets of the file to one or more corresponding LCN offsets of the host volume. Address translator 330 can look up a virtual address relative to a file (e.g., VCN offset) in the virtual-to-logical mapping to find a corresponding logical address relative to a host volume (e.g., LCN offset).

When a virtual hard disk is initially stored as a VHD file in host volume 137, the VHD file can be stored in a single contiguous area of the host volume 137. However, a VHD file can also be fragmented across a host volume 137 as multiple file extents, or as multiple groups of contiguous host clusters. A virtual-to-logical mapping of a file can also indicate whether the file is stored in multiple file extents. For example, a file record of an allocation table can provide that a first file extent of a VHD file (and thus the virtual clusters contained in the first file extent) corresponds to an LCN offset and a length (in host clusters) relative to a host volume 137. Thus, virtual clusters of a file can correspond to logical clusters of a host volume 137 that are not contiguous within host volume 137 (e.g., different file extents of the file are stored in various discrete locations of a host volume 137). Also, virtual clusters of a file can correspond to logical clusters of a host volume 137 that are out of sequential order (e.g., a first file extent can map to a first group of logical clusters of host volume 137, and a second file extent can map to a second group of logical clusters that are located in the host volume 137 before the first group). Thus, a VHD file can span a number of host clusters that may or may not be contiguous and/or sequentially ordered within the host volume 137. In the embodiments shown herein, at least a first extent of a virtual hard disk file is stored in contiguous host clusters of the host volume 137.

In the embodiment shown, hard disk tracks of the physical hard disk 410 can each span 256 sectors or 128 KB (using 512 byte sectors), host clusters can span 4 KB, and guest clusters can be set to span 8 KB (once guest partition 147 is written to virtual hard disk 200 and formatted with a guest file system). Hard disk track boundaries are shown as physical sector addresses in bold. The virtual hard disk 200 of FIG. 4A can be created by a disk management utility provided by an operating system that uses 1 MB as a default reserved portion size, which also indicates a default virtual starting location for a guest partition 147 after the reserved portion 210. Thus, the guest partition 147 of the virtual hard disk 200 would begin at a default virtual sector address of virtual sector (VS) offset 2048 (or 1 MB) from the beginning of the virtual hard disk 200. The reserved portion 210 of the VHD file would be written to 256 host clusters (using 512 byte sector size and host cluster size 4 KB, where 1 host cluster spans 8 sectors), relative to the starting point of the VHD file, LCN-31. Since the reserved portion 210 of the VHD file covers a number of whole host clusters (rather than portions of host clusters), the guest partition 147 would be written to the host file system starting at the beginning of the next host cluster, LCN-287. Also, since the guest clusters of the guest file system are 8 KB, the guest clusters would be aligned with the underlying 4 KB host clusters of the host file system, but will be misaligned with the hard disk tracks.

Misalignment of the guest partition 147 is illustrated at track boundary physical sector (PS) offset 2560, where guest cluster LCN-0 of the guest partition 147 overlaps a track boundary at PS-2560. Guest cluster LCN-0 corresponds to two host clusters, LCN-287 and LCN-288, on either side of track boundary PS-2560. Thus, any I/O operations (e.g., read and write operations) directed to the guest cluster LCN-0 will result in I/O operations respectively directed to the two host cluster LCN-287 and LCN-288 (e.g., read operation for the guest cluster LCN-0 will result in reading both the host clusters LCN-287 and LCN-288). Further, since the two host clusters are on either side of a disk track boundary (e.g., LCN-287 is at the end of one disk track and LCN-288 is at the beginning of the following disk track), any I/O operations directed to the host clusters LCN-287 and LCN-288 will also result in I/O operations respectively directed to the two disk tracks. Disk track read operations can degrade I/O performance due to the amount of time required to perform the disk track read operations (e.g., time required to move the track head from the first track to the second track).

Figure 4B:
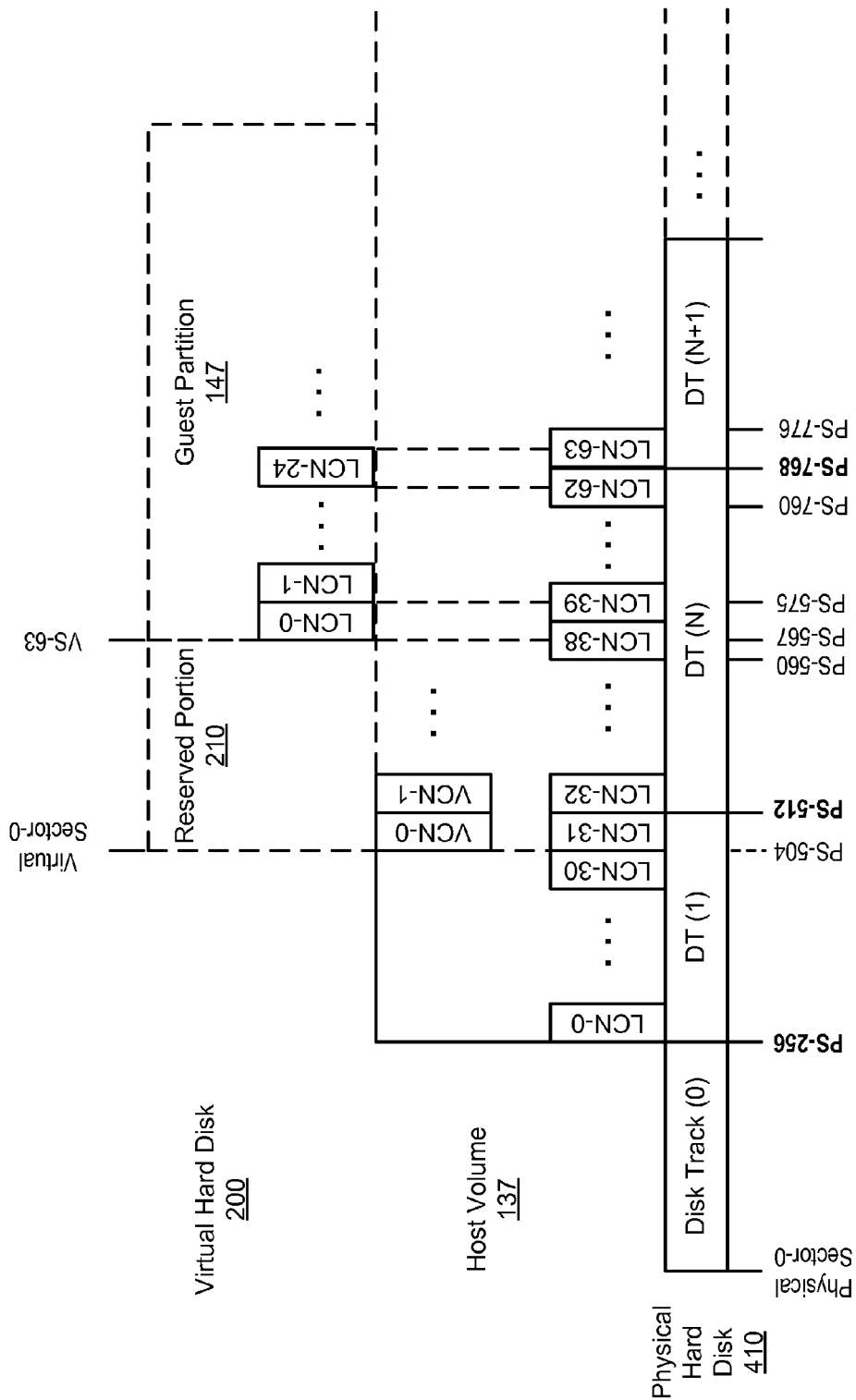

FIG. 4B is a block diagram illustrating another example of guest partition misalignment with underlying physical disk tracks. In the embodiment shown, hard disk tracks of the physical hard disk 410 can each span 256 sectors or 128 KB (using 512 byte sectors), host clusters can span 4 KB, and guest clusters can be set to span 4 KB (once guest partition 147 is written to virtual hard disk 200 and formatted with a guest file system). Hard disk track boundaries are shown as physical sector addresses in bold. A starting point of the VHD file can be written to the beginning of a host cluster (rather than writing the starting point of the VHD file in the middle of a host cluster), meaning that the VHD file can be aligned with the host clusters.

The virtual hard disk 200 of FIG. 4B can be created by a disk management utility provided by an operating system that uses 63 sectors as a default reserved portion size, which also indicates a default virtual starting location for a guest partition 147 after the reserved portion 210. Thus, the guest partition 147 of the virtual hard disk 200 would begin at a default virtual sector address of virtual sector (VS) offset 63 (or 31.5 KB) from the beginning of the virtual hard disk 200. The reserved portion 210 of the VHD file would be written to seven host clusters (the first 28 KB of the reserved portion 210 would be written to LCN-31 through LCN-37) and to part of an eighth host cluster (the following 3.5 KB of the reserved portion would be written to part of LCN-38), relative to the starting point of the VHD file, LCN-31. Since the partition is written to the host file system after the reserved portion 210, a first guest cluster LCN-0 of the guest partition 147 would be written to the host file system starting at the remaining part of the eighth host cluster (0.5 KB of LCN-38). However, if the first guest cluster is larger than 0.5 KB (or 512 bytes), the first guest cluster LCN-0 will be written to two host clusters: the first 0.5 KB of the first guest cluster will be written to the remaining portion of the eighth host cluster (LCN-38) and the rest of the guest cluster will be written to a ninth host cluster (LCN-39). Thus, guest clusters of guest partition 147 will be skewed in relation to the underlying host clusters, with each guest cluster correspond to portions of two host clusters, despite the beginning of the VHD file being aligned with the beginning of a host cluster.

Misalignment of the guest partition 147 is illustrated at track boundary physical sector (PS) offset 768, where guest cluster LCN-24 of the guest partition overlaps a track boundary at PS-768. Guest cluster LCN-24 corresponds to two host clusters, LCN-62 and LCN-63, on either side of track boundary PS-768. Thus, any I/O operations (e.g., read and write operations) directed to the guest cluster LCN-24 will result in I/O operations respectively directed to the two host cluster LCN-62 and LCN-63 (e.g., read operation for the guest cluster LCN-24 will result in reading both the host clusters LCN-62 and LCN-63). Further, since the two host clusters are on either side of disk track boundary PS-768 (e.g., LCN-62 is at the end of one disk track and LCN-63 is at the beginning of the following disk track), any I/O operations directed to the host clusters LCN-62 and LCN-63 will also result in I/O operations respectively directed to the two disk tracks, which can degrade I/O performance due to the amount of time required to perform the disk track read operations.

Figure 4C:
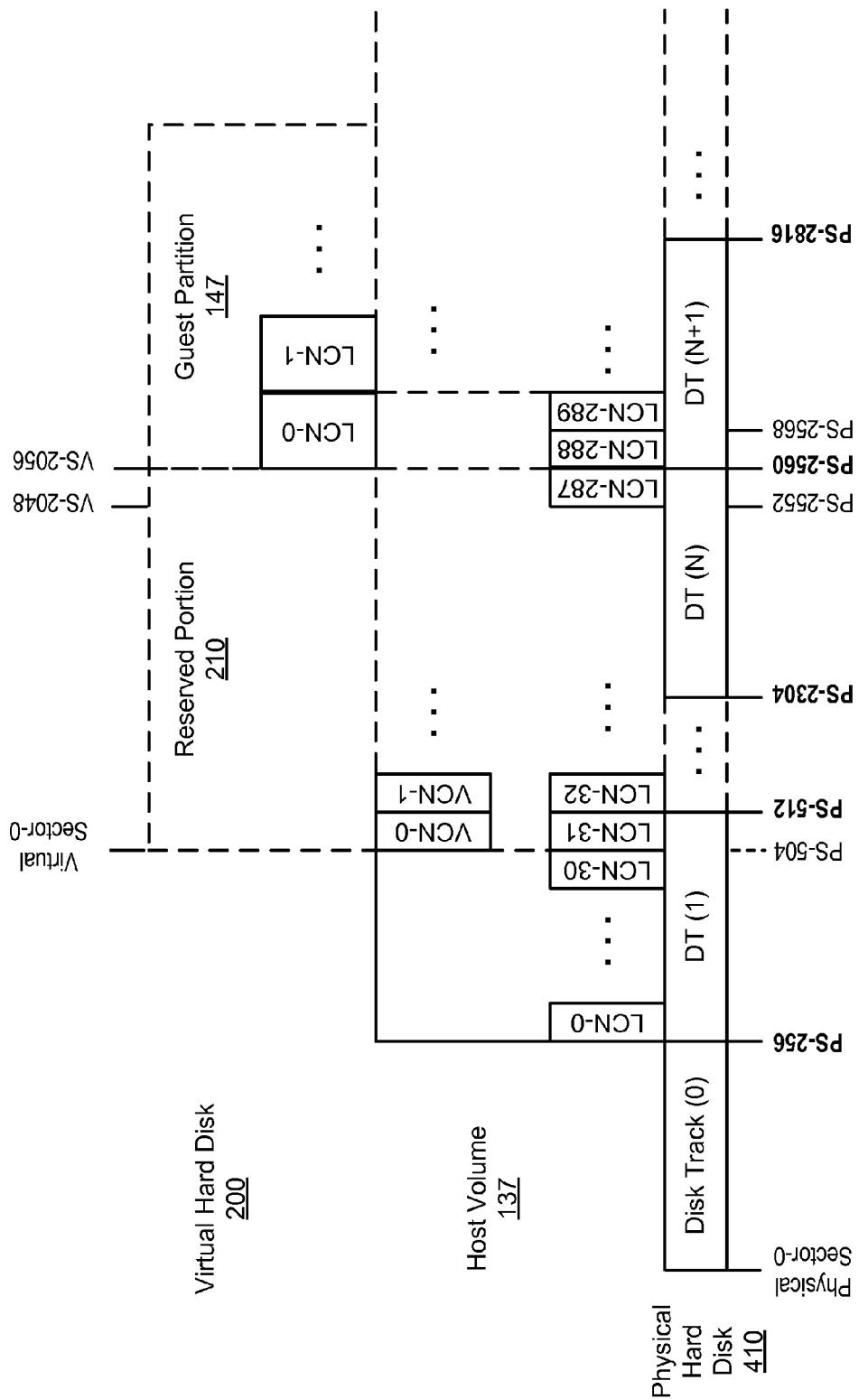
FIGS. 4C and 4D are block diagrams illustrating examples of guest partition alignment with underlying physical disk tracks, according to one embodiment.

FIG. 4C is a block diagram illustrating an example of guest partition alignment with underlying physical disk tracks. Rather than writing a guest partition 147 to the default virtual hard disk address of virtual sector address VS-2048 (as shown in FIG. 4A), a guest partition 147 instead can be written to a new virtual sector address within the virtual hard disk 200 that will align the starting location of guest partition 147 with a first sector at the beginning of the next hard disk track. In the embodiment shown, the next hard disk track boundary after the default virtual sector address is physical sector address PS-2560, which is equivalent to virtual sector address VS-2056, relative to the virtual hard disk 200. The size of reserved portion can be increased, shifting guest partition 147 from a default starting position of VS-2048 that would cause guest cluster LCN-0 to correspond to host clusters LCN-287 and LCN-288, to a new starting position VS-2056 (or shifting the default virtual starting location to a target starting location by 4 KB) that would cause guest cluster LCN-0 to correspond to host clusters LCN-288 and LCN-289. The subsequent guest clusters would also be shifted and would now be aligned with both underlying host clusters and with underlying hard disk tracks, thus avoiding guest clusters from overlapping track boundaries.

Figure 4D:
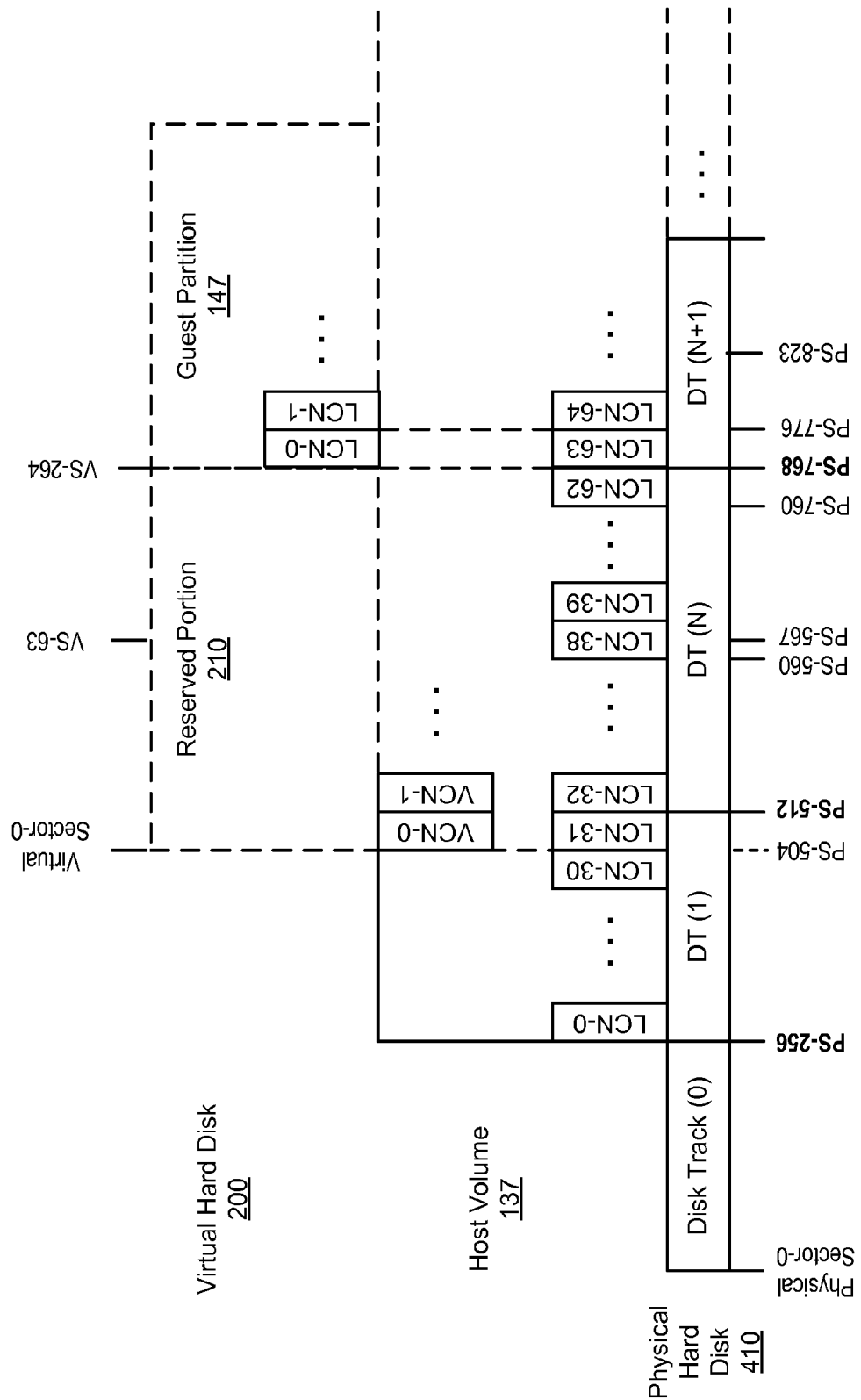

FIG. 4D is a block diagram illustrating another example of guest partition alignment with underlying physical disk tracks. Rather than writing a guest partition 147 to the default virtual hard disk address of virtual sector address VS-63 (as shown in FIG. 4B), a guest partition 147 can instead be written to a new virtual sector address within the virtual hard disk 200 that will align the starting location of guest partition 147 with a first sector at the beginning of the next hard disk track. In the embodiment shown, the next hard disk track boundary after the default virtual sector address is physical sector address PS-768, which is equivalent to virtual sector address VS-264, relative to the virtual hard disk 200. Guest partition 147 would be "shifted" from a default starting position of VS-63 that would cause guest cluster LCN-0 to correspond to host clusters LCN-62 and LCN-63, to a new starting position of VS-264 (or shifting the default virtual starting location to a target starting location by 201 sectors) that would cause guest cluster LCN-0 to correspond to host cluster LCN-63. The subsequent guest clusters would also be shifted and would now be aligned with both underlying host clusters and with underlying hard disk tracks, thus avoiding guest clusters from overlapping track boundaries.

FIG. 4E is a block diagram illustrating an example virtual hard disk file stored in host volume 137 as one or more file extents. In the embodiment shown, hard disk tracks of the physical hard disk 410 can each span 256 sectors or 128 KB (using 512 byte sectors), host clusters can span 4 KB, and guest clusters can be set to span 8 KB (once guest partition 147 is written to virtual hard disk 200 and formatted with a guest file system 149). Hard disk track boundaries are shown as physical sector addresses in bold. A starting point of the VHD file can be written to the beginning of a host cluster (rather than writing the starting point of the VHD file in the middle of a host cluster), meaning that the VHD file can be aligned with the host clusters.

If a VHD file containing an aligned guest partition were migrated to a new storage location in host volume 137 or in another storage device, guest clusters of the guest partition could be misaligned with underlying hard disk tracks in the new storage location. For example, a VHD file stored contiguously in host volume 137 can be represented by a single file extent, such as VHD file extent 1 400, where the guest partition 147 of the VHD file 400 is not aligned with underlying track boundaries. Migration module 350 can determine whether the guest partition of the VHD file is still aligned with underlying hard disk tracks. Migration module 350 can receive a check partition alignment request from guest alignment module 155, or can begin a partition alignment check in response to detecting that the VHD file has been migrated to the new storage location (e.g., can periodically check if a starting location of the VHD file relative to the host volume 137 has changed). Migration module 350 can request guest interface module 320 to obtain the current starting location of the existing guest partition 147 and guest sector size from the guest disk management utility. Host interface module 310 can receive the guest sector size and the current starting location of the existing guest partition 147 as a current virtual hard disk address from guest alignment module 155. Address translator 330 can translate the current virtual hard disk address into a current physical hard disk address, and partition address calculator 340 can determine whether the current physical hard disk address of the guest partition 147 is track aligned. Address translator 330 is discussed in further detail below in reference to FIG. 5, FIGS. 6A and 6B, and partition address calculator 340 is discussed in further detail below in reference to FIG. 5, FIG. 7A, and FIG. 7B.

If partition address calculator 340 determines the current physical hard disk address of the guest partition 147 is still track aligned, the guest clusters of the guest partition 147 are also still track aligned and the VHD file can remain in the new storage location. If partition address calculator 340 determines the current physical hard disk address of the guest partition 147 is not track aligned, data clusters of the VHD file 400 (e.g., virtual clusters of VHD file) can be moved or shifted in the host volume 137 to re-align the guest partition 147 with the next hard disk track, rather than deleting the existing guest partition and creating a new guest partition at an aligned starting location. For example, the next hard disk track boundary from the starting physical sector address PS-744 of guest partition 147 is physical sector address PS-768. Partition address calculator 340 can determine a target starting location (e.g., a first sector of the next hard disk track) at which the guest partition 147 should begin. However, instead of writing a new guest partition to the target starting location, migration module 350 can shift the VHD file 400 to move the existing guest partition 147 to the target starting location, thus aligning the guest partition with a first sector of the next hard disk track. Since the VHD file 400 can be stored as a single file extent of contiguous host clusters in host volume 137, the entire VHD file 400 can be shifted in the host volume 137 by the difference between the current volume address (translated from the current virtual hard disk address) of the guest partition 147 and a new volume address (translated from the target starting location) of the guest partition 147. Migration module 350 can communicate with the host FS 139 in order to move the VHD file.

Migration module 350 can determine a difference offset by calculating the difference between a current volume address (e.g., a logical cluster address) corresponding to the current starting location and a new volume address (e.g., a logical cluster address) corresponding to the target starting location, where the difference offset can be expressed in a number of logical clusters. Migration module 350 can request an existing starting point of the VHD file from the host FS 139 (e.g., a starting logical cluster address of the VHD file relative to the host volume 137), which can maintain the starting address of the VHD file in an allocation table. Migration module 350 can add the difference offset to the VHD file's existing starting point (e.g., a logical cluster address) to determine a new starting point for the VHD file 400. Migration module 350 can communicate with host FS 139 to move the VHD file from its existing starting point to the new starting point. Shifting the VHD file to a new location beginning at the new starting point will shift the beginning of the guest partition to the target starting location, and can result in the guest clusters of the guest partition being track aligned, where the guest clusters do not overlap a track boundary.

Similarly, if a VHD file were stored in host volume 137 as multiple file extents, guest clusters in the file extents could be misaligned with underlying hard disk tracks. For example, VHD file extent 1 400 and file extent 2 405 are misaligned with the underlying track boundaries, where VHD file extent 1 400 contains a starting point of an initial portion of guest partition 147 (e.g., VS-128), and VHD file extent 2 405 contains a starting point of a subsequent portion of guest partition 147 (e.g., VS-4000). Migration module 350 can determine whether each portion of the guest partition in each file extent is still aligned with underlying hard disk tracks. For each VHD file extent that contains a portion of the guest partition, migration module 350 can use the starting point of where a guest partition portion exists as a current starting location, or current virtual hard disk address. Address translator 330 can translate the current virtual hard disk address into a current physical hard disk address, and partition address calculator 340 can determine whether the current physical hard disk address of the guest partition portion is track aligned. Address translator 330 is discussed in further detail below in reference to FIG. 5, FIGS. 6A and 6B, and partition address calculator 340 is discussed in further detail below in reference to FIG. 5, FIG. 7A, and FIG. 7B.

If partition address calculator 340 determines that the current starting location of the guest partition portion is still track aligned, the guest clusters of the guest partition portion are also still track aligned and the VHD file extent can remain in the new storage location. If partition address calculator 340 determines that the current starting location of the guest partition portion is not track aligned, data clusters of the VHD file extent can be moved or shifted in the host volume 137 to re-align the guest partition portion with the next hard disk track. For example, the next hard disk track boundary from the starting physical sector address PS-744 for VHD file extent 1 400 is physical sector address PS-768, and the next hard disk track boundary from the starting physical sector address PS-6701568 for VHD file extent 2 405 is physical sector address PS-6702080. Partition address calculator 340 can determine a target starting location (e.g., a first sector of the next hard disk track) at which a guest partition portion should begin. However, instead of writing a new guest partition to the target starting location, migration module 350 can shift the VHD file extent to move the existing guest partition portion to the target starting location, thus aligning the guest partition portion with a first sector of the next hard disk track. Since each VHD file extent is stored as contiguous host clusters in host volume 137, each VHD file extent can be shifted in the host volume 137 by the difference between the default starting location of the guest partition portion and the target starting location of the guest partition portion. Migration module 350 can communicate with the host FS 139 in order to move the VHD file extents.

Migration module 350 can determine a difference offset by calculating the difference between a current volume address (e.g., a logical cluster address) corresponding to the current starting location and a new volume address (e.g., a logical cluster address) corresponding to the target starting location, where the difference offset can be expressed in a number of logical clusters. Migration module 150 can request an existing starting point or starting address of the VHD file extent from host FS 139 (e.g., a starting logical cluster address of the VHD file extent relative to the host volume 137), which can maintain the starting address of the VHD file in an allocation table. Migration module 350 can add the difference offset to the VHD file extent's existing starting point (e.g., a logical cluster address) to determine a new starting point for the VHD file extent. Migration module 350 can communicate with host FS 139 to move the VHD file extent from its existing starting point to the new starting point. Shifting the VHD file extent to a new location beginning at the new starting point will shift the beginning of the guest partition portion to the target starting location, and can result in the guest clusters of the guest partition portion being track aligned, where the guest clusters do not overlap a track boundary.

When moving one or more file extents of a VHD file, migration module 350 can request that the VHD file be detached from a running guest machine, or can request that the running guest machine attached to the VHD file be shut down, before the VHD file can be moved. Migration module 350 can perform the migration once the VHD file is detached from the running guest machine 140, or once the running guest machine 140 is shut down. Migration module 350 can communicate with host FS 139 to shift the data clusters of the VHD file from present host clusters to new host clusters of the new track aligned location, where the volume addresses of the data clusters of the VHD file are updated to the new volume addresses of the new track aligned location. The volume addresses (e.g., logical cluster addresses) can be updated in an allocation table of host FS 139. Once the shifting is complete, the VHD file can be attached back to the guest machine or the guest machine can be restarted, if the guest machine was shut down.

Figure 5:
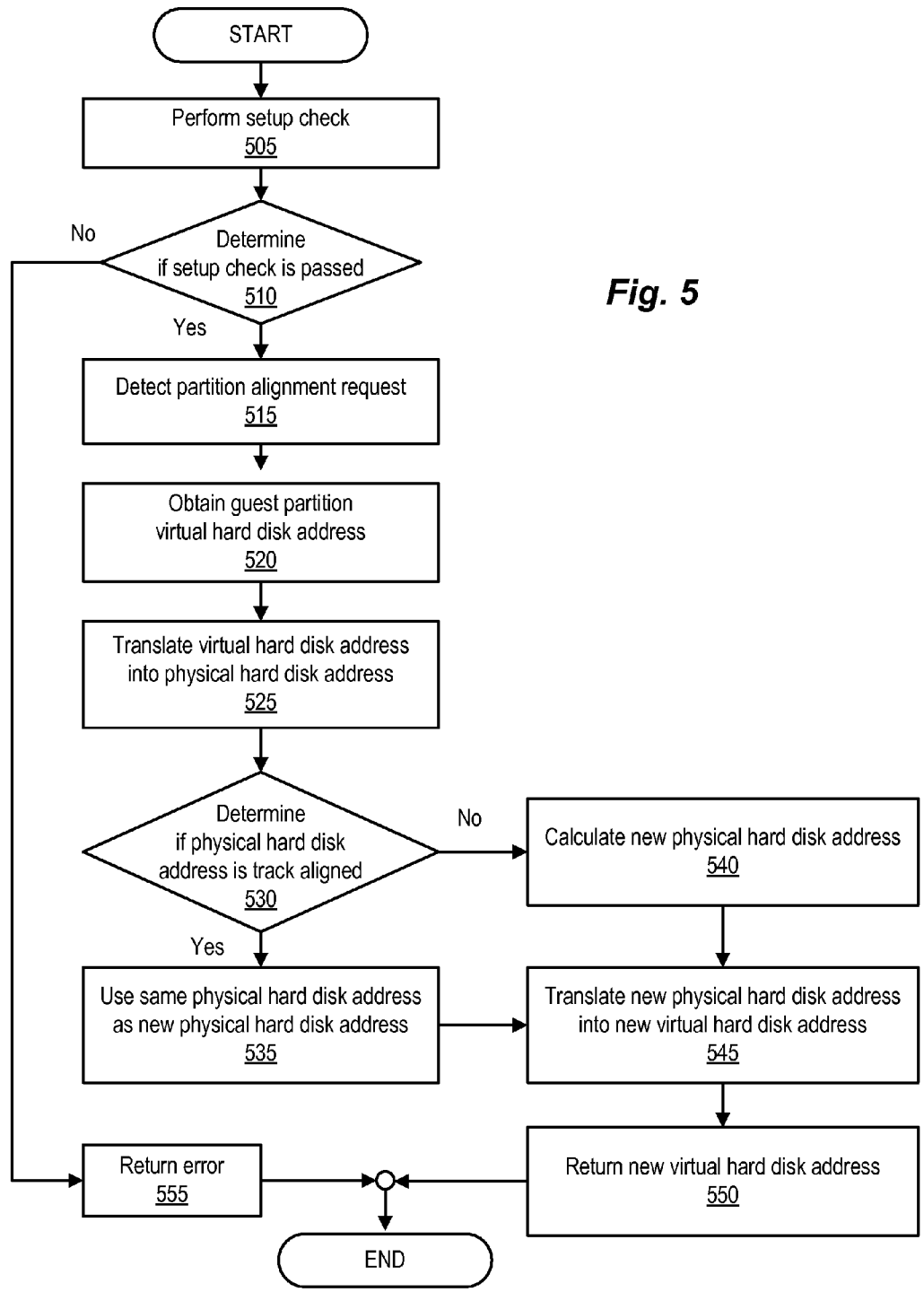
FIG. 5 is a flow chart illustrating acts of an example process implemented by an alignment module, according to one embodiment.

FIG. 5 is a flow chart illustrating acts of an example process implemented by an alignment module 150. The process of FIG. 5 begins at operation 505, performing a setup check. Host alignment module 150 can confirm in a setup check that the host machine 130 is configured with a track alignment mechanism, such as Storage Foundation for Windows. Guest alignment module 155 can also confirm that a virtual hard disk file has been successfully created by guest disk management utility, and that the virtual hard disk file has enough free space to contain a guest partition of the default partition size. The process of FIG. 5 continues to operation 510, determining if the setup check is passed. If any of the above-discussed setup checks are not passed, the process continues to operation 555, returning an error to guest disk management utility via guest interface module 310, and the process ends.

If the setup check is passed, the process continues to operation 515, detecting a partition alignment request for an aligned guest partition address that is received at the host alignment module 150 from guest alignment module 155 via guest interface module 310. A partition alignment request can be a message that is generated by guest alignment module 155 in response to receiving a request for an aligned guest partition address from guest disk management utility or in response to an intercepted call from guest disk management utility. The process continues to operation 520, obtaining a virtual hard disk address (e.g., a virtual sector address). For example, address translator 330 can obtain a virtual hard disk address of the guest partition from the partition alignment request, as discussed above.

The process of FIG. 5 continues to operation 525, translating the virtual hard disk address into a physical hard disk address relative to a physical hard disk. For example, address translator 330 can translate a virtual hard disk address of the guest partition into a physical hard disk address. Operation 525 is described in greater detail in reference to FIG. 6A. The process of FIG. 5 continues to operation 530, determining if the physical hard disk address is track aligned with the underlying hard disk tracks. For example, partition address calculator 340 can determine if a physical hard disk address of the guest partition starts at a first sector of a disk track. Operation 530 is described in greater detail in reference to FIG. 7A. If the physical hard disk address is not track aligned, the process of FIG. 5 continues to operation 540, calculating a new physical hard disk address (e.g., a new physical sector address). Operation 540 is described in greater detail in reference to FIG. 7B. If the physical hard disk address is track aligned, the process of FIG. 5 continues to operation 535, using the same physical hard disk address as the new physical hard disk address.

From operation 535 and from operation 540, the process of FIG. 5 continues to operation 545, translating the new physical hard disk address into a new virtual hard disk address (e.g., a new virtual sector address). For example, address translator 330 can translate a new physical hard disk address relative to the physical hard disk into a new virtual hard disk address relative to the virtual hard disk. Operation 545 is described in greater detail in reference to FIG. 6B. The process of FIG. 5 continues to operation 550, returning the new virtual hard disk address (e.g., target starting location) to guest interface module 310, and the process ends.

FIG. 6A is a flow chart illustrating acts of an example translation sub-process implemented by an alignment module 150, such as by an address translator 330 of alignment module 150. Address translator 330 can translate a virtual hard disk address into a physical hard disk address. The translation sub-process uses a guest sector size of the virtual hard disk and host cluster size (e.g., bytes per cluster of the host volume). As discussed above, address translator 330 can receive a guest sector size of the virtual hard disk from guest interface module 310 and can receive host cluster size from host interface module 320.

The process starts at operation 615, translating a virtual hard disk address (e.g., a virtual sector address) relative to the virtual hard disk into a file address (e.g., a virtual cluster address) relative to the VHD file. For example, address translator 330 can translate the received virtual sector address (at which the guest partition begins) into an equivalent virtual cluster address relative to the virtual hard disk file. Address translator 330 can determine the equivalent virtual cluster address by calculating an equivalent number of bytes represented by the virtual sector address (e.g., multiplying the virtual sector offset by the guest sector size of the virtual hard disk) and divide the equivalent number of bytes by the host cluster size (e.g., bytes per cluster of the host volume) to arrive at the equivalent virtual cluster address at which the guest partition begins (which is an address of the first cluster of the guest partition).

The process of FIG. 6A continues to operation 620, translating the file address (e.g., virtual cluster address) relative to the VHD file into a volume address (e.g., logical cluster address) relative to the host volume. For example, address translator 330 can refer to a virtual-to-logical mapping maintained in an allocation table of the host file system, and can use the virtual cluster address of the VHD file to lookup a logical cluster address relative to the host volume.

The process of FIG. 6A continues to operation 625, translating the volume address (e.g., logical cluster address) relative to the host volume into a physical hard disk address (e.g., physical sector address) relative to the physical hard disk. For example, address translator 330 can refer to a logical-to-physical mapping maintained by a host volume manager on host machine 130 and can use the logical cluster address to lookup a physical sector address relative to the physical hard disk. The physical hard disk address can be provided to partition address calculator 340.

Address translator 330 can also perform a reverse translation sub-process of FIG. 6B to translate a physical hard disk address (e.g., a new physical sector address calculated by partition address calculator 340) into a virtual hard disk address that can be provided to the guest interface module 310, which in turn provides the virtual hard disk address as the target starting location to guest disk management utility. The process of FIG. 6B starts at operation 630, translating a physical hard disk address (e.g., a new physical sector address) relative to the physical hard disk into a volume address (e.g., a new logical cluster address) relative to host volume. For example, address translator 330 can refer to a logical-to-physical mapping maintained by a volume manager on host machine 130 and can use the physical sector address relative to the physical hard disk to lookup a logical cluster address relative to the host volume.

The process of FIG. 6B continues to operation 635, translating the volume address (e.g., a new logical cluster address) relative to the host volume into a file address (e.g., a new virtual cluster address) relative to the VHD file. For example, address translator 330 can refer to a virtual-to-logical mapping maintained in an allocation table of the host file system, and can use the logical cluster address relative to the host volume to lookup a virtual cluster address relative to the VHD file.

The process of FIG. 6B continues to operation 640, translating the file address (e.g., a new virtual cluster address) relative to the VHD file into a virtual hard disk address (e.g., a new virtual sector address) relative to the virtual hard disk. For example, address translator 330 can translate the virtual cluster address relative to the VHD file into a virtual sector address (at which the guest partition can begin) relative to the virtual hard disk. Address translator 330 can determine the equivalent virtual sector address by calculating an equivalent number of bytes represented by the virtual cluster address by multiplying the virtual cluster offset by the host cluster size (e.g., bytes per cluster of the host volume) and divide the equivalent number of bytes by the guest sector size of the virtual hard disk to arrive at a virtual sector address, or a new starting location of a guest partition within the virtual hard disk. The new virtual hard disk address can be provided to guest disk management interface module 310 (e.g., as a target starting location of the guest partition).

Figure 7A:
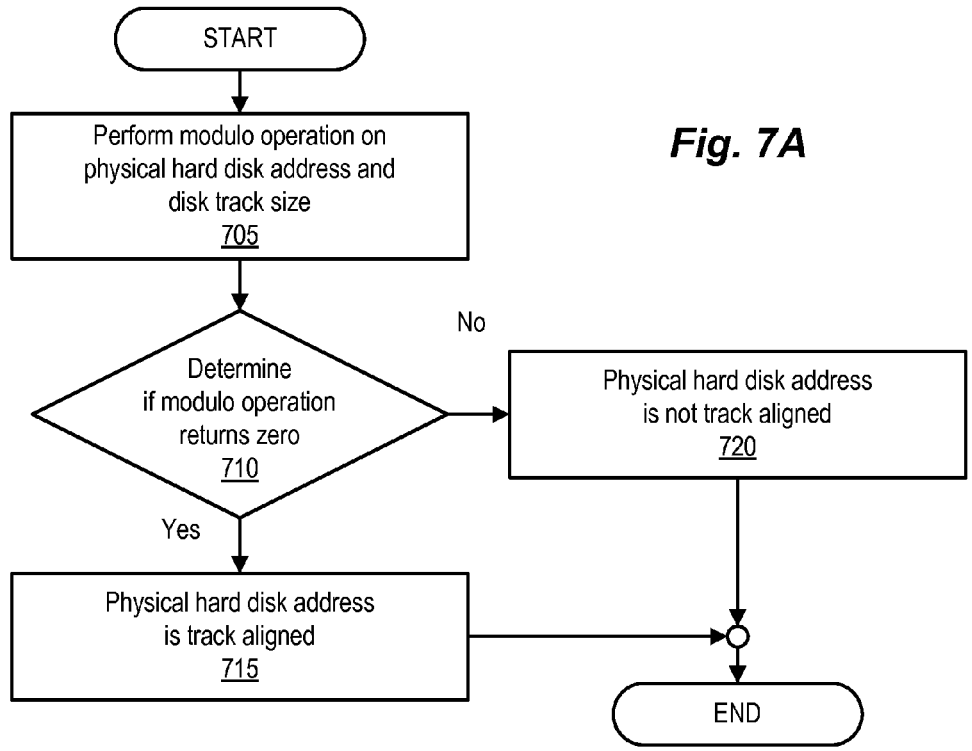
FIGS. 7A and 7B are flow charts illustrating acts of example calculation sub-processes implemented by an alignment module, according to one embodiment.

FIG. 7A is a flow chart illustrating acts of an example calculation sub-process implemented by an alignment module 150, such as by a partition address calculator 340 of alignment module 150. For example, partition address calculator 340 can determine whether a physical hard disk address is track aligned by determining if the physical hard disk address corresponds to a first sector of a disk track. One way to determine if the physical hard disk address is aligned with a track boundary is by performing a modulo operation. A modulo operation returns the remainder of the division of one number (e.g., the physical sector address) by another (e.g., the disk track size). If the remainder is zero, the physical sector address is an integer multiple of the disk track size, and thus the physical hard disk address corresponds to a first sector of a disk track. If the remainder is not zero, the physical hard disk address does not correspond to a first sector of a disk track, and thus is not track aligned.

The sub-process of FIG. 7A starts at operation 705, performing a modulo operation on a physical hard disk address (e.g., a physical sector address of the guest partition) and disk track size in sectors. The modulo operation divides the disk track size into the physical sector address to determine if the physical hard disk address is track aligned. The modulo operation can also be performed on the physical hard disk address expressed in bytes and the disk track size expressed in bytes (e.g., where the disk track size in bytes is calculated by multiplying the number of sectors per disk track by the host sector size of the physical hard disk). As discussed above, partition address calculator 340 can obtain host sector size and disk track size of the physical hard disk via host interface module 320.

The sub-process of FIG. 7A continues to operation 710, determining if the modulo operation returns zero. If the modulo operation returns zero, then the sub-process continues to operation 715, the physical hard disk address is determined to be track aligned, and the sub-process ends. For example, a disk track size of 256 sectors can be divided into a physical sector address of sector offset PS-768 evenly without any remainder, indicating that physical sector address PS-768 corresponds to a first sector of a disk track and is thus track aligned. If the modulo operation does not return zero, then the sub-process continues to operation 720, the physical hard disk address is not determined to be track aligned, and the sub-process ends.

Figure 7B:
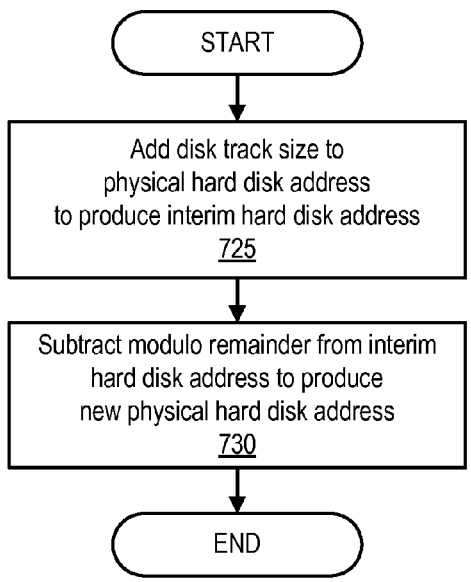

FIG. 7B is a flow chart illustrating acts of an example calculation sub-process implemented by an alignment module 150, such as by a partition address calculator 340 of alignment module 150. If a physical hard disk address is not track aligned, partition address calculator 340 can determine a new physical hard disk address as a target starting location for the guest partition to begin. Using the non-track aligned physical sector address as a starting point, partition address calculator 340 can determine that a guest partition should start at a first sector at the beginning of the next hard disk track. Thus, the guest partition can be created at the target starting location of a first sector at the beginning of the next hard disk track boundary, resulting in the guest clusters being aligned with the underlying disk track boundary.

The sub-process of FIG. 7B starts at operation 725, adding disk track size to a physical hard disk address (e.g., physical sector address of the guest partition) to produce an interim hard disk address (e.g., an interim physical sector address of the guest partition). For example, partition address calculator 340 can shift the non-track aligned physical sector address to the next hard disk track by adding the disk track size (in sectors) to the physical sector address, and thus produces an interim physical sector address on the next hard disk track. In FIG. 4D, for example, a default physical sector address of PS-567 on disk track DT(N) (which correspond to default virtual sector address VS-63) can be shifted by the length of a disk track to interim physical sector address of PS-823 on the next disk track, DT(N+1).

The sub-process of FIG. 7B continues to operation 730, subtracting the modulo remainder from the interim hard disk address to produce a new physical hard disk address, or a new physical sector address of the guest partition. Partition address calculator 304 can shift the interim hard disk address back to the first sector at the beginning of the next hard disk track by subtracting the modulo remainder (in sectors) from the interim hard disk address. For example, the modulo remainder of PS-567 and disk track size of 256 sectors is 55 sectors. The new physical sector address is the interim physical sector address of PS-823 minus 55 sectors, resulting in a new guest partition physical address of sector offset PS-768 of disk track DT(N+1). The sub-process then ends.

Figure 8:
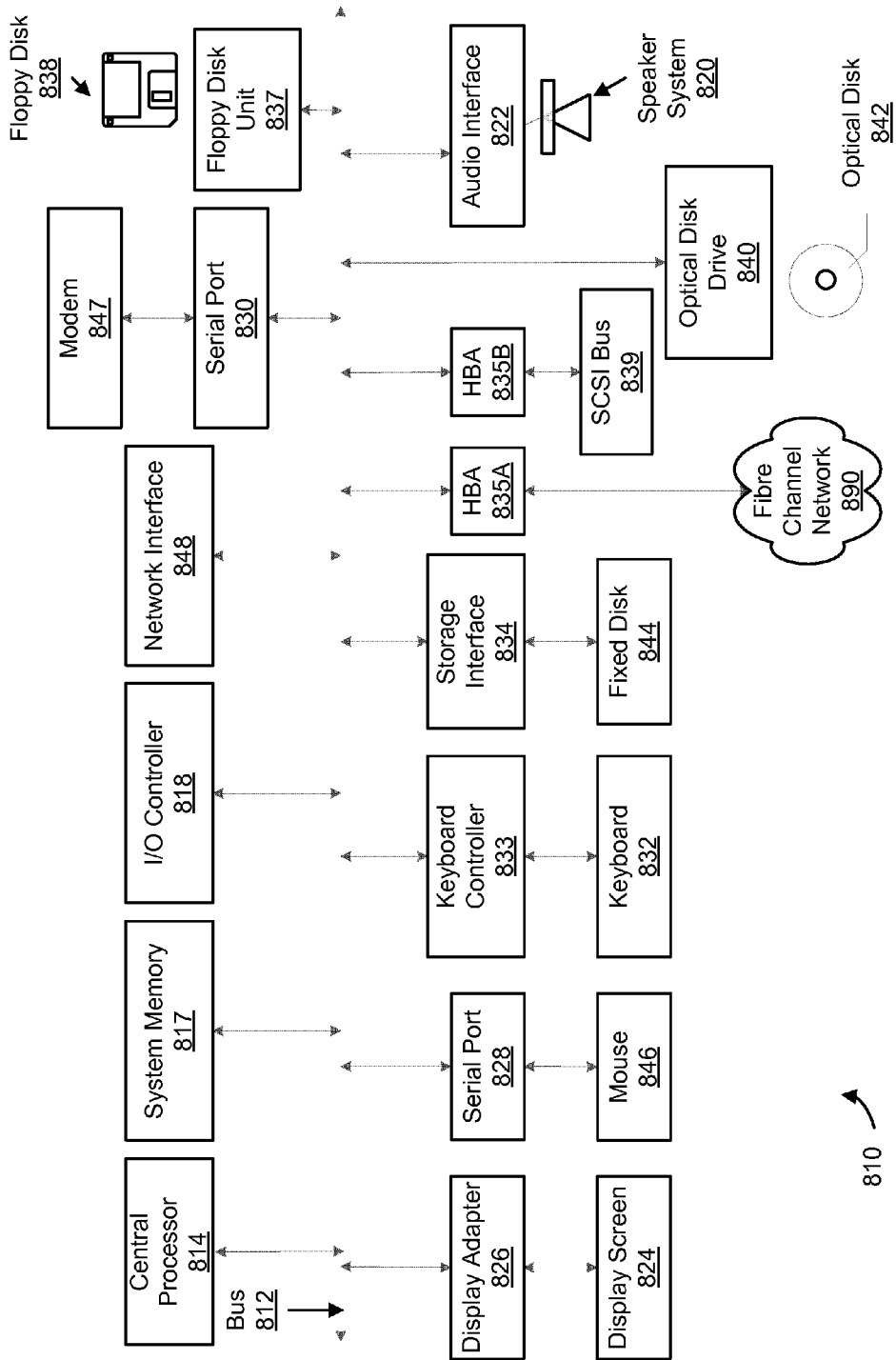
FIG. 8 is a block diagram illustrating components of an example computer system suitable for implementing embodiments of the present disclosure, according to one embodiment.

FIG. 8 is a block diagram that illustrates an example of a computer system 810 that is suitable for implementing the present disclosure. Computer system 810 may be illustrative of various computer systems in the virtualization system 100, such as system(s) 110, 120, and/or 140, among others. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. Code for the automatically performing operations on such applications based on their dependencies on other applications (such as described above with reference to the process of FIG. 5-7), etc., to implement the present disclosure can be stored in computer-readable storage media such as one or more of system memory 817, fixed disk 844, optical disk 842, or floppy disk 838. Memory 817 is also used for storing temporary variables or other intermediate information during the execution of instructions by the processor 814. The operating system provided on computer system 810 may be MS-DOS®, MS-WINDOWS®, OS/2®, UNIX®, Linux®, or another known operating system.

Moreover, regarding the signals described herein, it will be understood that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
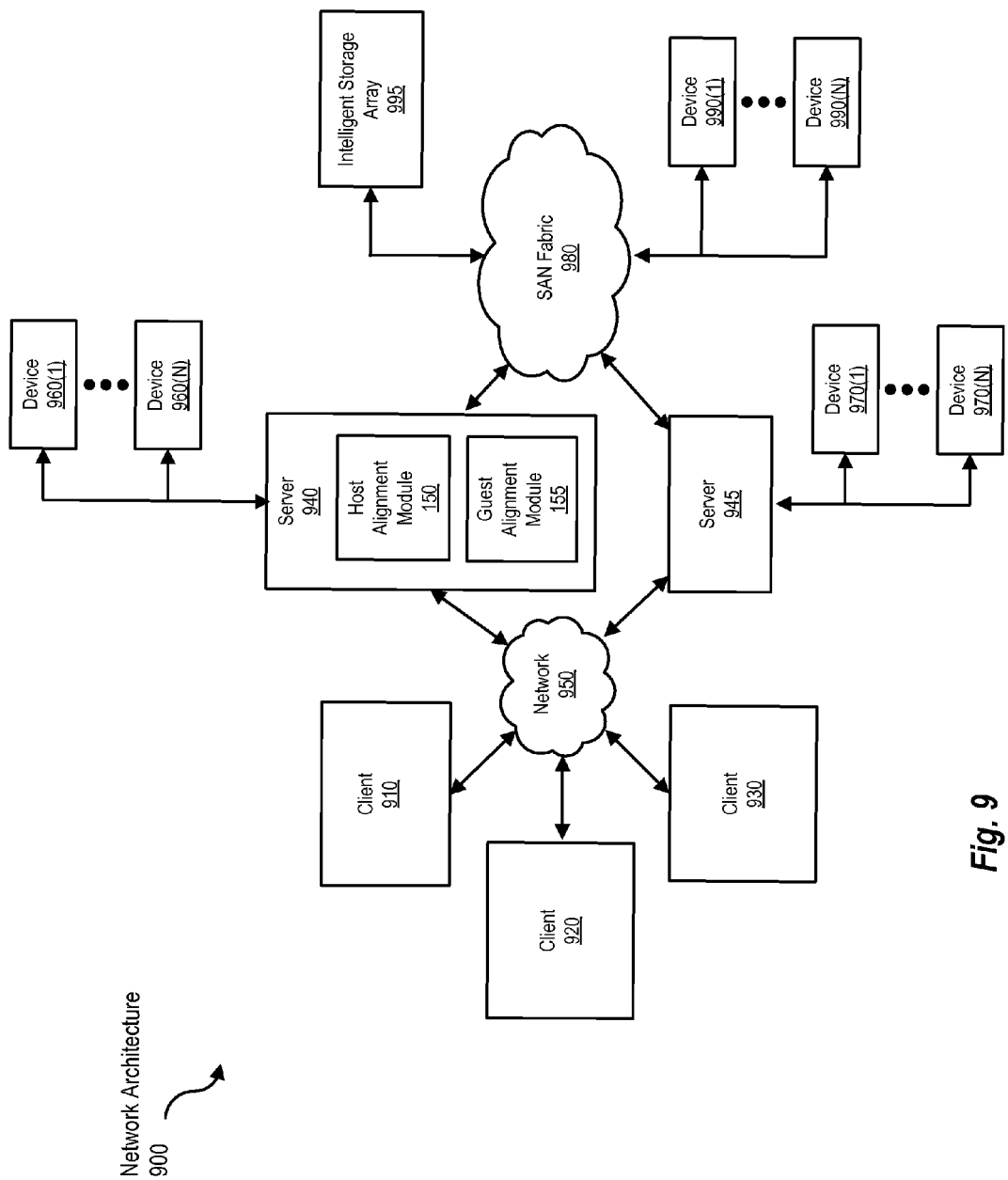
FIG. 9 is a block diagram illustrating components of an example computer system suitable for implementing embodiments of the present disclosure, according to one embodiment.

FIG. 9 is a block diagram of a network system 900 in which client systems 910, 920 and 930 and servers 940, and 945 can be coupled to a network 950. Client systems 910, 920 and 930 generally represent any type or form of computing device or system, such as client systems 110 in FIG. 1 or computer system 810 in FIG. 8.

Similarly, servers 940 and 945 generally represent computing devices or systems, such as application servers or database servers, configured to provide various database services and/or run certain software applications, such as servers 120 and 170 in FIG. 1 or computer system 810 in FIG. 8. Network 950 generally represents any telecommunication or computer network including, for example, an intranet, a wide area network (WAN), a local area network (LAN), a personal area network (PAN), or the Internet. In one example, client systems 910, 920 and/or 930 and/or servers 940, and/or 945 can include a host alignment module 150 and a guest alignment module 155, as shown in FIGS. 1 and 2, and/or virtual machines such as a host machine 130 and a guest machine 140, as shown in FIG. 1.

As illustrated in FIG. 9, one or more storage devices 960(1)-(N) can be directly attached to server 940. Similarly, one or more storage devices 970(1)-(N) can be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) can represent network-attached storage (NAS) devices configured to communicate with servers 940 and 945 using various protocols, such as Network File System (NFS), Server Message Block (SMB), or Common Internet File System (CIFS).

Servers 940 and 945 can also be connected to a storage area network (SAN) fabric 980. SAN fabric 980 generally represents any type or form of computer network or architecture capable of facilitating communication between multiple storage devices. SAN fabric 980 can facilitate communication between servers 940 and 945 and a plurality of storage devices 990(1)-(N) and/or an intelligent storage array 995. SAN fabric 980 can also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to computer system 810 of FIG. 8, a communication interface can be used to provide connectivity between each client system 920 and 930 and network 950. Client systems 910, 920 and 930 can be able to access information on server 940 or 945 using, for example, a web browser or other client software. Such software can allow client systems 910, 920 and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the embodiments disclosed herein can also be encoded as a computer program, stored in and run by server 940 and server 945, and distributed to client systems 910, 920 and 930 over network 950.

In some examples, all or a portion of the computing devices in FIGS. 1, 8, and 9 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, a host alignment module 150 in FIG. 1 can transform information received from a volume manager and a file system into an address of a guest partition.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a request for a target starting location of a guest partition, wherein
     the guest partition is operably coupled to a guest machine, wherein
       the guest machine comprises
         a virtual hard disk, and
         a guest operating system; and
       the virtual hard disk comprises the guest partition;
   in response to receipt of the request,
     obtaining a virtual hard disk address of the guest partition, wherein
       the virtual hard disk address is relative to the virtual hard disk;
     translating the virtual hard disk address into a physical hard disk address relative to a physical hard disk, wherein
       the physical hard disk address corresponds to a hard disk track of the physical hard disk;
     determining that the physical hard disk address is not track aligned, wherein
       the determining comprises performing a modulo operation, wherein
         the performing comprises dividing a disk track size into the physical hard disk address;
     calculating a new physical hard disk address of the guest partition, wherein the calculating comprises:
       determining an interim hard disk address by, at least in part, adding the disk track size to the physical hard disk address, and calculating the new physical hard disk address by, at least in part,
sutracting a modulo remainder from the interim hard disk address; and
migrating an image of the virtual hard disk, wherein
the migrating is performed in response to the determining that the physical hard disk address is not track aligned,
the migrating involves shifting the image of the virtual hard disk to the new physical hard disk address of the guest partition, and
the migrating is performed while the guest machine is powered on.

2. The method of claim 1, further comprising:
in response to the determining that the physical hard disk address is not track aligned,
calculating a next physical hard disk address relative to the physical hard disk,
wherein
the next physical hard disk address corresponds to a next hard disk track of the physical hard disk;
translating the next physical hard disk address into a new virtual hard disk address; and
responding to the request with the new virtual hard disk address as a new target starting location.

3. The method of claim 2, wherein
the virtual hard disk address comprises a virtual sector address relative to the virtual hard disk,
the physical hard disk address comprises a physical sector address relative to the physical hard disk, and
the image of the virtual hard disk is stored as a virtual hard disk (VHD) file on the physical hard disk.

4. The method of claim 3, wherein the translating the virtual hard disk address into the physical hard disk address comprises:
translating the virtual sector address into a file address relative to the VHD file;
translating the file address into a volume address relative to a volume residing on the physical hard disk, wherein the VHD file is stored in the volume; and
translating the volume address into the physical sector address.

5. The method of claim 3, wherein the translating the new physical hard disk address into the new virtual hard disk address comprises:
translating the new physical hard disk address into a new volume address relative to a volume;
translating the new volume address into a new file address relative to the VHD file; and
translating the new file address into the new virtual sector address.

6. The method of claim 1, wherein the determining whether the physical hard disk address is track aligned comprises:
determining whether the physical hard disk address corresponds to a first sector of the hard disk track.

7. The method of claim 2, wherein the new physical hard disk address corresponds to a first sector of the next hard disk track.

8. The method of claim 1, wherein
the determining further comprises
obtaining the disk track size of the physical hard disk via a host interface.

9. A computer system comprising:
a guest alignment module comprising a guest interface module configured to
receive a request for a target starting location of a guest partition, wherein
the guest partition is operably coupled to a guest machine, wherein
the guest machine comprises
a virtual hard disk, and
a guest operating system; and
the virtual hard disk comprises the guest partition; and
a host alignment module comprising
an address translator configured to
obtain a virtual hard disk address of the guest partition, in response to
receipt of the request, wherein
the virtual hard disk address is relative to the virtual hard disk, and
translate the virtual hard disk address into a physical hard disk address
relative to a physical hard disk, wherein
the physical hard disk address corresponds to a hard disk track of the physical hard disk,
a partition address calculator configured to determine whether the physical hard disk address is track aligned, comprising
determining whether the physical hard disk is track aligned comprises
performing a modulo operation, wherein
the performing comprises dividing a disk track size into the physical hard disk address, and
calculating a new physical hard disk address of the guest partition,
wherein the calculating comprises
determining an interim hard disk address by, at least in part, adding the disk track size to the physical hard disk address, and
calculating the new physical hard disk address by, at least in part, subtracting a modulo remainder from the interim hard disk address, and
a migration module configured to
perform a migration of an image of the virtual hard disk, wherein
the migration is performed in response to determining that the physical hard disk address is not track aligned,
the migration comprises shifting the image of the virtual hard disk to the new physical hard disk address of the guest partition, and
the migration is performed while the guest machine is powered on.

10. The system of claim 9, wherein
the partition address calculator is further configured to
calculate a next physical hard disk address relative to the physical hard disk, in response to a determination that the physical hard disk address is not track aligned, wherein
the next physical hard disk address corresponds to a next hard disk track of the physical hard disk;
the address translator is further configured to
translate the next physical hard disk address into a new virtual hard disk address; and
the guest interface module is further configured to
respond to the request with the new virtual hard disk address as a new target starting location.

11. The system of claim 10, wherein
the virtual hard disk address comprises a virtual sector address relative to the virtual hard disk,
the physical hard disk address comprises a physical sector address relative to the physical hard disk, and
the image of the virtual hard disk is stored as a virtual hard disk (VHD) file on the physical hard disk.

12. The system of claim 11, wherein
the address translator is further configured to
   translate the virtual sector address into a file address relative to the VHD file;
   translate the file address into a volume address relative to a volume residing on
      the physical hard disk, wherein
      the VHD file is stored in the volume; and
   translate the volume address into the physical sector address.

13. The system of claim 11, wherein
the address translator is further configured to
   translate the new physical hard disk address into a new volume address relative to a volume;
   translate the new volume address into a new file address relative to the VHD file; and
   translate the new file address into the new virtual sector address.

14. The system of claim 9, wherein
the partition address calculator is further configured to
   determine whether the physical hard disk address corresponds to a first sector of the hard disk track.

15. The system of claim 10, wherein the new physical hard disk address corresponds to a first sector of the next hard disk track.

16. An apparatus comprising:
a processor; and
a non-transitory computer-readable storage medium coupled to the processor and configured to store instructions executable by the processor to implement a guest alignment module configured to
   receive a request for a target starting location of a guest partition, wherein
      the guest partition is operably coupled to a guest machine, wherein
         the guest machine comprises
            a virtual hard disk, and
            a guest operating system and
         the virtual hard disk comprises the guest partition; and
      a host alignment module comprising
         an address translator configured to
            obtain a virtual hard disk address of the guest partition, in response to receipt of the request, wherein
               the virtual hard disk address is relative to the virtual hard disk, and
            translate the virtual hard disk address into a physical hard disk address relative to a physical hard disk, wherein
               the physical hard disk address corresponds to a hard disk track of the physical hard disk; and
         a partition address calculator configured to
            determine whether the physical hard disk address is track aligned, comprising
               performing a modulo operation, wherein
                  the performing comprises dividing a disk track size into the physical hard disk address, and
               calculate a new physical hard disk address of the guest partition, comprising
                  determining an interim hard disk address by, at least in part, adding the disk track size to the physical hard disk address, and
                  calculating the new physical hard disk address by, at least in part, subtracting a modulo remainder from the interim hard disk address; and
         a migration module configured to perform a migration of an image of the virtual hard disk, wherein
            the migration is performed in response to determining that the physical hard disk address is not track aligned,
            the migration comprises shifting the image of the virtual hard disk to a new volume address of the guest partition, and
            the migration is performed while the guest machine is powered on.

17. The apparatus of claim 15, wherein
the host alignment module is further configured to
   calculate a next physical hard disk address relative to the physical hard disk, in response to a determination that the physical hard disk address is not track aligned, wherein
      the next physical hard disk address corresponds to a next hard disk track of the physical hard disk,
   translate the next physical hard disk address into a new virtual hard disk address, and respond to the request with the new virtual hard disk address as a new target starting location.

18. The apparatus of claim 17, wherein
the virtual hard disk address comprises a virtual sector address relative to the virtual hard disk,
the physical hard disk address comprises a physical sector address relative to the physical hard disk, and
the image of the virtual hard disk is stored as a virtual hard disk (VHD) file on the physical hard disk.

19. The apparatus of claim 18, wherein
the host alignment module is further configured to
   translate the virtual sector address into a file address relative to the VHD file;
   translate the file address into a volume address relative to a volume residing on
      the physical hard disk, wherein
      the VHD file is stored in the volume; and
   translate the volume address into the physical sector address.

20. The apparatus of claim 18, wherein
the host alignment module is further configured to
   translate the new physical hard disk address into a new volume address relative to a volume;
   translate the new volume address into a new file address relative to the VHD file; and
   translate the new file address into the new virtual sector address.

21. The apparatus of claim 16, wherein
the host alignment module is further configured to
   determine whether the physical hard disk address corresponds to a first sector of the hard disk track.

* * * * *

UNITED STATES PATENT AND TRADEMARK OFFICE
CERTIFICATE OF CORRECTION

Page 1 of 1

PATENT NO. : 9,104,339 B1
APPLICATION NO. : 13/457808
DATED : August 11, 2015
INVENTOR(S) : Kalekar et al.

It is certified that error appears in the above-identified patent and that said Letters Patent is hereby corrected as shown below:

In the claims

Column 25
Line 50, Claim 5, replace: "the new virtual" by -- a new virtual --

Column 27
Line 17, Claim 13, replace: "the new virtual" by -- a new virtual --

Column 28
Line 54, Claim 20, replace: "the new virtual" by -- a new virtual --

Signed and Sealed this
Third Day of May, 2016

Michelle K. Lee
*Director of the United States Patent and Trademark Office*